(12) United States Patent
Hussain et al.

(10) Patent No.: US 10,645,172 B1
(45) Date of Patent: May 5, 2020

(54) SOCKET TUNNELING CONNECTIONS IN A SERVICE PROVIDER ENVIRONMENT

(71) Applicant: Amazon Technologies, Inc., Seattle, WA (US)

(72) Inventors: Amjad Hussain, Bellevue, WA (US); Sivaprasad Venkata Padisetty, Bellevue, WA (US); Steven Merlin Twitchell, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 265 days.

(21) Appl. No.: 15/474,697

(22) Filed: Mar. 30, 2017

(51) Int. Cl.
- *G06F 15/16* (2006.01)
- *H04L 29/08* (2006.01)
- *H04L 29/06* (2006.01)

(52) U.S. Cl.
CPC .......... *H04L 67/141* (2013.01); *H04L 63/029* (2013.01); *H04L 67/02* (2013.01); *H04L 67/10* (2013.01); *H04L 67/2861* (2013.01); *H04L 67/38* (2013.01); *H04L 69/16* (2013.01)

(58) Field of Classification Search
CPC ..... H04L 67/141; H04L 63/029; H04L 67/02; H04L 69/16; H04L 67/10; H04L 67/38; H04L 67/2861; H04L 67/14; H04L 67/142; H04L 67/143
USPC .......................................................... 709/227
See application file for complete search history.

(56) References Cited

U.S. PATENT DOCUMENTS

| | | | |
|---|---|---|---|
| 2011/0302408 A1* | 12/2011 | McDermott | H04L 63/0464 713/153 |
| 2014/0207957 A1* | 7/2014 | Zhang | H04L 67/02 709/227 |
| 2017/0094587 A1* | 3/2017 | Ding | H04W 8/22 |
| 2017/0109190 A1* | 4/2017 | Sha | G06F 9/45558 |
| 2017/0279874 A1* | 9/2017 | Jolfaei | H04L 67/1002 |
| 2017/0323279 A1* | 11/2017 | Dion | G07F 19/20 |
| 2018/0077552 A1* | 3/2018 | Lee | H04W 4/90 |

* cited by examiner

*Primary Examiner* — Aftab N. Khan
*Assistant Examiner* — Anh Nguyen
(74) *Attorney, Agent, or Firm* — Thorpe North & Western, LLP.

(57) ABSTRACT

Technology is described for communicating with a computer instance. A request may be received to create a session connection between a computing instance with a messaging service that operates in a computing service environment. The session connection may be created between the agent running on the computing instance and the messaging service. A socket tunneling connection may be generated to replace the session connection. The socket tunneling connection may be between the agent and the messaging service. Message data streams may be passed between the agent and the messaging service over the socket tunneling connection. An instruction received from a client device may be forwarded to the computing instance over a second socket tunneling connection created with the client device. Command output received from the computing instance over the second socket tunneling connection may be forwarded. The output may result from an execution of the instruction at the computing instance.

20 Claims, 13 Drawing Sheets

SOCKET TUNNELING CONNECTIONS IN A SERVICE PROVIDER ENVIRONMENT

BACKGROUND

The advent of virtualization technologies for computing resources has provided benefits with respect to managing large-scale computing resources for many customers with diverse needs. In addition, virtualization technologies have allowed various computing resources or computing services to be efficiently and securely shared by multiple customers. For example, virtualization technologies may allow a single physical host (e.g., a single physical computing machine) in a service provider environment to be shared among multiple customers by providing each customer with one or more computing instances hosted by the single physical host using a hypervisor. A computing instance may be a guest machine acting as a distinct logical computing system that provides a customer with the perception that the customer is the sole operator and administrator of a given virtualized hardware computing resource.

A messaging service operating in the service provider environment may provide reliable asynchronous message delivery to the computing instances. The messaging service may function as a broker that provides a software and/or hardware infrastructure to support sending and receiving of messages between computing instances and other components in the service provider environment. The messaging service may provide a reliable, fail-safe and scalable hosted message queue, and the implementation of the message queue may result in various advantages. For example, the message queue may be redundantly stored across multiple geographic regions in the service provider environment to increase robustness. In addition, the message queue may provide message storage when computing instances are busy or unavailable.

DETAILED DESCRIPTION

Figure 1:
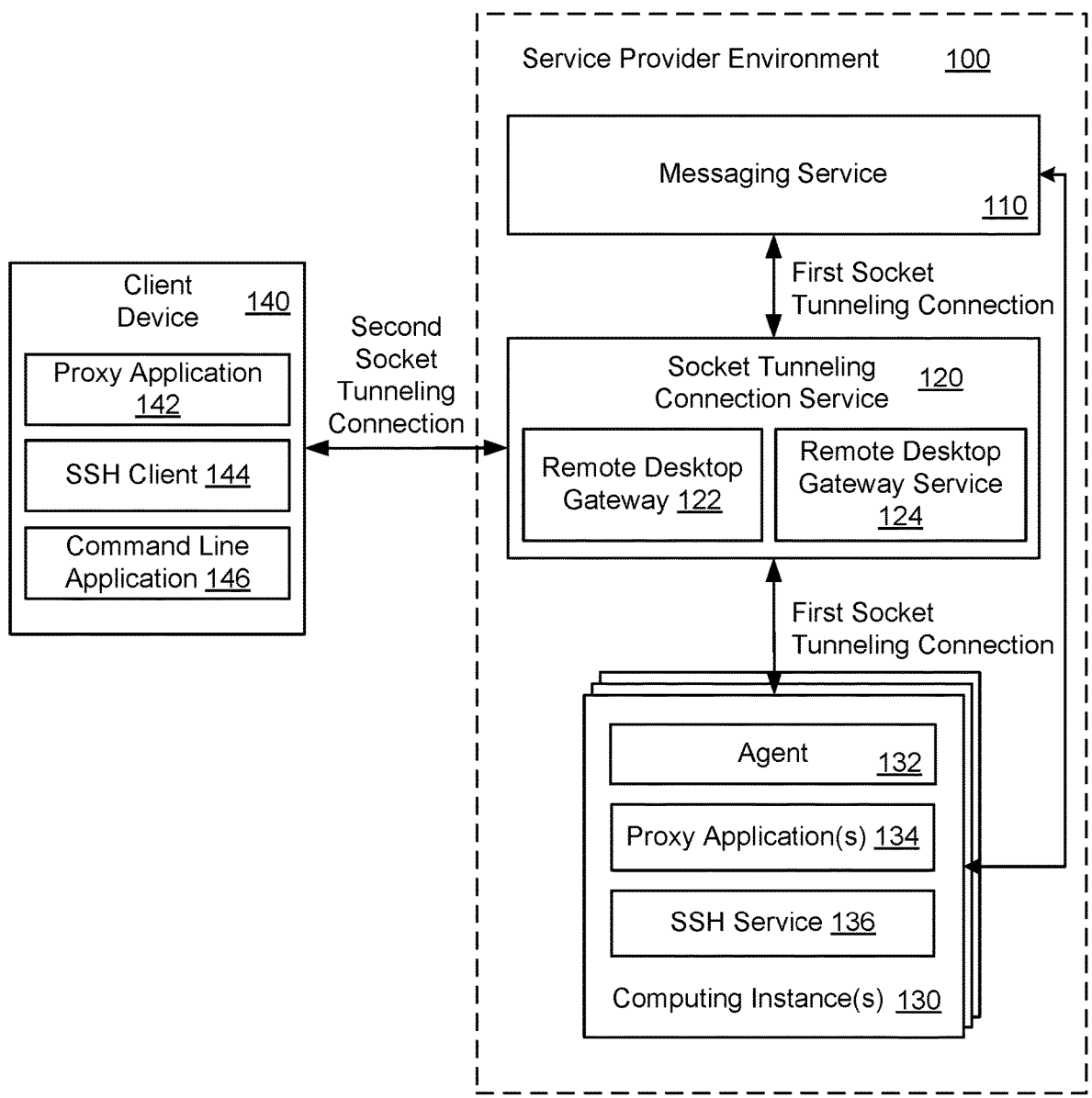
FIG. 1 illustrates a system and related operations for creating socket tunneling connections between computing instances and a messaging service via a socket tunneling connection service according to an example of the present technology.

A technology is described for creating socket tunneling connections between agents running on computing instances and a messaging service in a service provider environment. A socket tunneling connection service operating in the service provider environment may create a socket tunneling connection (or secure web socket connection) between an agent running on a computing instance and the messaging service. The socket tunneling connection may be created between the agent and the messaging service based on a request received from a client device. The messaging service may be a managed message service that operates in the service provider environment. The messaging service may enable the communication of messages, for example containing commands, instructions, documents, or scripts, over the socket tunneling connection to the computing instance(s), for example, from the client device. The socket tunneling connection may be an encrypted bidirectional socket connection that is open for a defined period of time between the agent running on the computing instance and the messaging service via the socket tunneling connection service. The socket tunneling connection may enable message data streams to be delivered, via the socket tunneling connection service, between the agent and the messaging service over the socket tunneling connection. The messages data streams may then be sent to the client device. The socket tunneling connection service may provide an interactive ability to run commands, or an interactive run command ability, that enables a command to be sent from a command line application (that utilizes a command line interface) running on a client device to the computing instance, as well as to return data from the computing devices in response to the commands.

In one configuration, the socket tunneling connection service may receive a request from the agent running on the computing instance. The request may be for creating a session connection between the computing instance and the messaging service. As an example, the request may be a hypertext transfer protocol secure (HTTPS) request. The socket tunneling connection service may create the session connection between the agent running on the computing instance and the message service. The session connection may provide limited capabilities. After the session connection is created, the socket tunneling connection service may upgrade the session connection to the socket tunneling connection between the agent running on the computing instance and the messaging service. The socket tunneling connection service may upgrade the session connection using an HTTPS upgrade mechanism. The creation of the socket tunneling connection may enable the message data streams to be provided between the agent running on the computing instance and the messaging service via the socket tunneling connection service, as well as enable message data streams to be sent to the client device.

In one configuration, the socket tunneling connection between the agent running on the computing instance and the messaging service via the socket tunneling connection service may utilize a transmission control protocol (TCP). However, the socket tunneling connection may support traffic that follows a protocol that is different than TCP. For example, the socket tunneling connection service may direct non-TCP traffic for the computing instance over the socket tunneling connection, and the non-TCP traffic may include secure shell (SSH) traffic or remote desktop (RDP) traffic. The non-TCP traffic may be provided over the socket tunneling connection without opening inbound network connections to the computing instance 130.

For example, the socket tunneling connection service may create a separate socket tunneling connection between a client device that runs an SSH client and a proxy application that runs on the computing instance via the socket tunneling connection service. The separate socket tunneling connection may enable the client device and the computing instance to communicate SSH traffic (i.e., non-TCP traffic) via the socket tunneling connection service. The SSH traffic may be authenticated using an access management service.

As another example, the socket tunneling connection service may create a separate socket tunneling connection between a client device that runs on a web browser and a proxy application that runs on the computing instance via the socket tunneling connection service. The separate socket tunneling connection may enable the client device and the computing instance to communicate RDP traffic (i.e., non-TCP traffic) via the socket tunneling connection service. The RDP traffic may be authenticated using the access management service.

In one configuration, the socket tunneling connection service may provide an interactive ability to run commands, or an interactive run command ability, that enables a command to be sent from a command line application (that utilizes a command line interface) running on a client device to the computing instance. The command may be sent over a separate socket tunneling connection between the command line application (on the client device) and a command runner on the computing instance via the socket tunneling connection service. Command output may be streamed over the separate socket tunneling connection to the client device for display. In addition, the command line application may be configured to receive the command output over the separate socket tunneling connection.

In one configuration, interactive run command(s) may be sent from the client device to the computing instance via the socket tunneling connection service, and the command output (in response to the interactive run commands) may be provided back to the client device via the socket tunneling connection service. In this configuration, the socket tunneling connection service may transmit the interactive run commands and capture the corresponding command output, for example in a separate stream. In other words, a return stream (e.g., separate socket tunneling connection) may include the command output for each of the interactive run command. The socket tunneling connection service may communicate with the command runner on the computing instance in order to transmit the interactive run commands and capture the corresponding command output. The socket tunneling connection service may provide duplicate copies of the separate stream to one or more third party devices (e.g., devices associated with support personnel). As a result, support personnel may view which interactive run commands have been sent to the computing instance and verify that the output data is acceptable in view of the interactive run commands.

FIG. 1 illustrates an exemplary system and related operations for creating socket tunneling connections between computing instances 130 and a messaging service 110 via a socket tunneling connection service 120. The messaging service 110, the socket tunneling connection service 120 and the computing instances 130 may operate in a service provider environment 100. In a specific example, the socket tunneling connection service 120 may create the socket tunneling connection between an agent 132 running on a computing instance 130 and the messaging service 110. The socket tunneling connection may be an encrypted bidirectional socket connection that is open for a defined period of time (e.g., 3-4 hours) between the agent 132 running on the computing instance 130 and the messaging service 110 via the socket tunneling connection service 120. The socket tunneling connection may be over a transport layer security (TLS) encrypted channel. The socket tunneling connection may enable message data streams to be delivered, via the socket tunneling connection service 120, between the agent 132 running on the computing instance 130 and the messaging service 110. The messaging service 110 may be, for instance, a service that sends messages to a group of computing instances, for example to configure a large number of instances without having to manually configure each instance, as more fully discussed below. The messaging service 110 may enable the communication of messages, for example containing commands, instructions, documents, or scripts, to the computing instance(s), for configuring the instances.

In one configuration, the socket tunneling connection service 120 may receive a request from the agent 132 running on the computing instance 130. The request may be for creating a session connection between the computing instance 130 and the messaging service 110. As an example, the request may be a hypertext transfer protocol secure (HTTPS) request. The HTTPS request may be received over a defined TCP port (e.g., port 443). The socket tunneling connection service 120 may create the session connection between the agent 132 running on the computing instance 130 and the message service 110.

After the session connection is initially created, the socket tunneling connection service 120 may upgrade the session connection to the socket tunneling connection between the agent 132 running on the computing instance 130 and the messaging service 110. The socket tunneling connection service may upgrade the session connection using an HTTPS upgrade mechanism. The socket tunneling connection may utilize a socket tunneling connection protocol, and a customer firewall may view the socket tunneling connection as an outbound HTTPS request over the defined TCP port (e.g., port 443), which may be more likely to be permitted by network administrators.

After creation of the socket tunneling connection, the socket tunneling connection service 120 may direct or route the message data streams between the agent 132 running on the computing instance 130 and the messaging service 110 over the socket tunneling connection. The agent 132 may receive messages and route the message to an appropriate agent subsystem or computing instance 130 subsystem. In addition, the agent 132 may execute commands indicated in the messages, for example to configure the computing instance 130 or run commands on the computing instance 130.

In one configuration, the socket tunneling connection service 120 may create a separate socket tunneling connection between a client device 140 and the computing instance 130, and the separate socket tunneling connection may be utilized to communicate secure shell (SSH) traffic between the client device 140 and the computing instance 130. More specifically, the client device 140 may include a proxy application 142 and an SSH client 144. In addition, the computing instance 130 may include a proxy application 134 and an SSH service 136 (e.g., an SSH daemon), and the separate socket tunneling connection may be between the proxy application 142 on the client device 140 and the proxy application 134 on the computing instance 130. The proxy applications 142, 134 on the client device 140 and the computing instance 130, respectively, may enable the communication of SSH traffic between the client device 140 and the computing instance 130. The socket tunneling connection service 120 may route or direct SSH traffic between the client device 140 and the computing instance 130 over the separate socket tunneling connection. The ability to utilize SSH may be beneficial to customers that are interacting with the computing instance 130 using the client device 140.

In one configuration, the socket tunneling connection service 120 may create a separate socket tunneling connection between the client device 140 and the computing instance 130, and the separate socket tunneling connection may be utilized to communicate remote desktop (RDP) traffic between the client device 140 and the computing instance 130. More specifically, the client device 140 may include a web browser (not shown), the computing instance 130 may include the proxy application 134, and the socket tunneling connection service 120 may include a remote desktop gateway 122 that is in communication with a remote desktop gateway service 124. The remote desktop gateway 122 may provide the remote desktop gateway service 124 to connect to services on the computing instance 130, such as terminal services client (TSC) or virtual network computing (VNC) services. The remote desktop gateway 122 and remote desktop gateway service 124 may enable the communication of RDP traffic between the client device 140 and the computing instance 130 via the socket tunneling connection service 120 that operates the remote desktop gateway 122 and the remote desktop gateway service 124. The separate socket tunneling connection may be between the web browser in the client device 140 and the proxy application 134 in the computing instance 130, and the separate socket tunneling connection may traverse the remote desktop gateway 122 and the remote desktop gateway service 124 in the socket tunneling connection service 120. The socket tunneling connection service 120 may route or direct RDP traffic between the client device 140 and the computing instance 130 over the separate socket tunneling connection. The ability to utilize RDP may be beneficial to customers that wish to interact with the computing instance 130 using the client device 140.

In one example, the client device 140 may run a command line application 146 that supports an interactive run command feature, for example to send commands for configuring instances. The command line application 146 may enable a command to be sent from a command line interface running on the client device 140 to the computing instance 130. The command may be sent over a separate socket tunneling connection between the command line application 146 (on the client device 140) to the computing instance 130 via the socket tunneling connection service 120. Command output may be streamed back over the separate socket tunneling connection to the client device 140 for display on a display screen. As a result, customers interacting with the client device 140 may view a stream of the command output, and therefore, the customers may obtain knowledge about instructions executing on the computing instances 130 that are being run in the service provider environment 100. In addition, the command line application 146 may be configured to receive the command output over the separate socket tunneling connection.

It should be noted that use of the socket tunneling connection service 120 is not required in order for the client device 140 to send commands to the computing instances 130. The client device 140 may connect to and communicate with the messaging service 110 without using the socket tunneling connection service 120, for example using application programming interfaces (APIs). In this way, the client device 140 can submit requests to the messaging service 110 for commands to be sent to one or a large number of computing instances 130, for example to configure those instances. The messaging service 110 may connect to the computing instances 130 without using the socket tunneling connection service 120 to send the commands to the computing instances 130, for example using the agent 132 to run the commands and send the responses back to the messaging service. Furthermore, the socket tunneling connections may be initiated or created based on the client device 140 sending an API request, for example to run a command, to the messaging service 110. After the messaging service 110 receives the request, the appropriate socket tunneling connections may be created between the messaging service 110, the computing instances 130, and the client device 140. In this way, even though a command that was not initial sent via a tunneling connection, a tunneling connection can be used for the subsequent interactions.

In one example, in previous solutions, a messaging service in a service provider environment provided management functionality to enable customers to manage their computing instances to scale. For example, if the customer needed to configure 10,000 instances at the same time, it would be tedious for the customer to manually send messages to each of the 10,000 computing instances. Therefore, the messaging service could be used to provide reliable asynchronous messages to a group of computing instances. The messaging service was capable of sending a message received from the customer to each of the 10,000 computing instances. The messaging service permitted agents running on the computing instances to perform long-polling calls to retrieve messages sent to the computing instances. The agents on the computing instances polled for messages over a defined duration (e.g., 20 seconds), and messages that arrived during the defined duration were delivered to the agents on the computing instances. At the end of the defined duration, the agents on the computing instances initiated another long-polling call. The long-polling reduced the number of empty responses by allowing the messaging service to wait until a message was available before responding to the agents on the computing instances. However, since a vast majority of the long-polling calls returned no messages, the messaging service spent an undesirable amount of time connecting to the agents on the computing instances, checking for messages, waiting for the defined duration (e.g., 20 seconds), tearing down or disconnecting a connection after a poll timeout expired.

The long-polling calls to the messaging service may be replaced with the socket tunneling connections between the messaging service and the agents running on the computing instances via the socket tunneling connection service. In this example, the socket tunneling connection may remain open for an extended period of time. The socket tunneling connection service may direct messages that are received during this time over the socket tunneling connection. The ability to keep open secure connections for an extended period of time may be more beneficial to conserving computing resources as compared to frequently opening and closing connections between the agents on the computing instances and the messaging service. As a result, a reduced number of servers may be utilized to handle messaging traffic. The socket tunneling connection may enable message delivery in a reduced amount of time as compared to the previous long-polling call approach. The usage of socket tunneling connections can replace previous solutions, in which web APIs were used to communicate with services in a service provider environment.

Furthermore, in previous solutions, customers had difficulty interacting with computing instances via SSH or RDP. In previous solutions, customers that wanted to connect to their computing instance using a remote desktop application had to click on their computing instance in a console to determine a public Internet Protocol (IP) address, download an administrator console, decrypt a password, start the remote desktop application, and then enter the IP address, an administrator account name and the password to open a connection to the computing instance. In contrast, with the socket tunneling connection service, customers with appropriate permissions may select the computing instance in the console, and then select an option to open a desktop in an actions dropdown menu, thereby opening an RDP session to their computing instance in a browser window. In addition, with the socket tunneling connection service, customers may open an SSH console to the computing instance by selecting the computing instance, and then selecting an option to open the SSH console in an actions dropdown menu. When establishing connections for SSH and/or RDP, authentication and authorization for these connections may be handled by an access management service that operates in the service provider environment. Therefore, the socket tunneling connection service may communicate with the computing instance for authenticated SSH console access from a console or command line interface, or alternatively, the socket tunneling connection service may communicate with the computing instance for authenticated remote desktop access using RDP or virtual network computing (VNC) connections from the console.

Furthermore, in previous solutions, the messaging service, including an asynchronous run command functionality, allowed authorized customers to run command scripts on multiple computing instances over time, and then later query the results. However, viewing results of the command scripts involved an undue number of selections in a console and/or excessive interaction with a command line when obtaining a command identifier. In addition, in previous solutions, viewing the results of the command script involved obtaining an invocation identifier, obtaining an identification of a logical storage unit, forming a prefix for the logical storage unit, and downloading results from the logical storage unit. In contrast, with the present technology, the interactivity may enable command results to be streamed over the socket tunneling back to the command line application running on the client and displayed progressively in a command line interface. The command line application and the agent running on the computing instance may each be configured to communicate with the socket tunneling connection service over the socket tunneling connection can receive or send the stream of command results, respectively.

Figure 2:
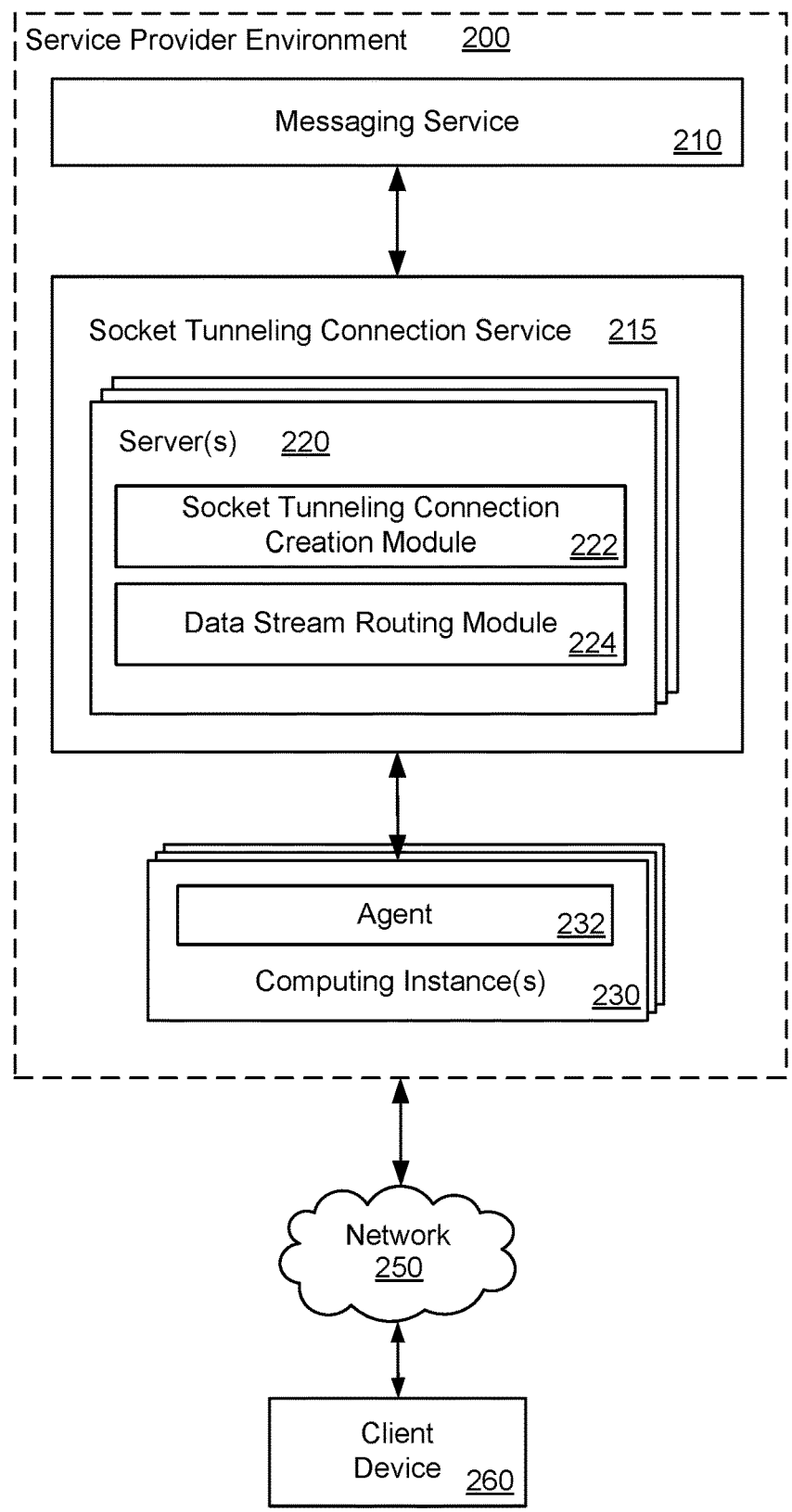
FIG. 2 is an illustration of a networked system for creating socket tunneling connections between computing instances and a messaging service via a socket tunneling connection service according to an example of the present technology.

FIG. 2 illustrates components of an example service provider environment 200 according to one example of the present technology. The service provider environment 200 may include a messaging service 210 and a socket tunneling connection service 215. The socket tunneling connection service 215 may operate one or more servers 220 and data store(s) (not shown) to create socket tunneling connections between computing instances 230 running in the service provider environment 200 and the messaging service 210 via the socket tunneling connection service 215. More specifically, the socket tunneling connection service 215 may create a socket tunneling connection between an agent 232 running on a computing instance 230 and the messaging service 210 via the socket tunneling connection service 215. The creation of the socket tunneling connection may enable data streams to be passed, via the socket tunneling connection service 215, between the agent 232 running on the computing instance 230 and the messaging service 210 over the socket tunneling connection. In addition, a client device 260 may communicate with the computing instance 230 over a network 250. The client device 260 and the computing instance 230 may communicate via the socket tunneling connection service 215.

The server(s) 220 operated by the socket tunneling connection service 215 may include a number of modules for creating the socket tunneling connections between the computing instances 230 and the messaging service 210 via the socket tunneling connection service 215. The server(s) 220 may include a socket tunneling connection creation module 222, a data stream routing module 224, and other applications, services, processes, systems, engines, or functionality not discussed in detail herein.

The socket tunneling connection creation module 222 may be configured to receive a request from the agent 232 running on the computing instance 230 to create a session connection between the computing instance 230 and the messaging service 210. As discussed above, an initial request may be received by the messaging service 210 from the client device 260, which may trigger the agent 232 to send the request to create the a session connection. The socket tunneling connection creation module 222 may create the session connection between the agent 232 running on the computing instance 230 and the messaging service 210. The socket tunneling connection creation module 222 may upgrade the session connection to create the socket tunneling connection between the agent 232 running on the computing instance 230 and the messaging service 210. The socket tunneling connection creation module 222 may automatically upgrade the session connection to create the socket tunneling connection, or alternatively, the socket tunneling connection creation may upgrade the session connection upon receiving a request from the agent 232. The socket tunneling connection may be an encrypted bidirectional socket connection that is open for a defined period of time between the agent 232 running on the computing instance 230 and the messaging service 210.

In one configuration, the socket tunneling connection creation module 222 may create a separate socket tunneling connection between the client device 260 that runs a secure shell (SSH) client (not shown) and a proxy application (not shown) that runs on the computing instance 230. In another configuration, the socket tunneling connection creation module 222 may create a separate socket tunneling connection between the client device 260 that runs a web browser (not shown) and a proxy application (not shown) that runs on the computing instance 230. The separate socket tunneling connection between the client device 260 (e.g., that runs the SSH client and/or the web browser) and proxy application(s) on the computing instance 230 may traverse the socket tunneling connection service 215.

The data stream routing module 224 may be configured to route message data streams between the agent 232 running on the computing instance 230 and the messaging service 210 over the socket tunneling connection. In other words, the message data streams may pass through and be directed by the data stream routing module 224. The message data streams may follow a transmission control protocol (TCP). In addition, the data stream routing module 224 may route non-TCP traffic over the separate socket tunneling connections. For example, the data stream routing module 224 may route SSH traffic and/or RDP traffic between the client device 260 and the computing instance 230 over the separate socket tunneling connection(s).

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The client device 260 may comprise a computer system that is embodied in the form of a desktop computer, a laptop computer, mobile devices, cellular telephones, smartphones, set-top boxes, network-enabled televisions, tablet computer systems, or other devices with like capability.

The network 250 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
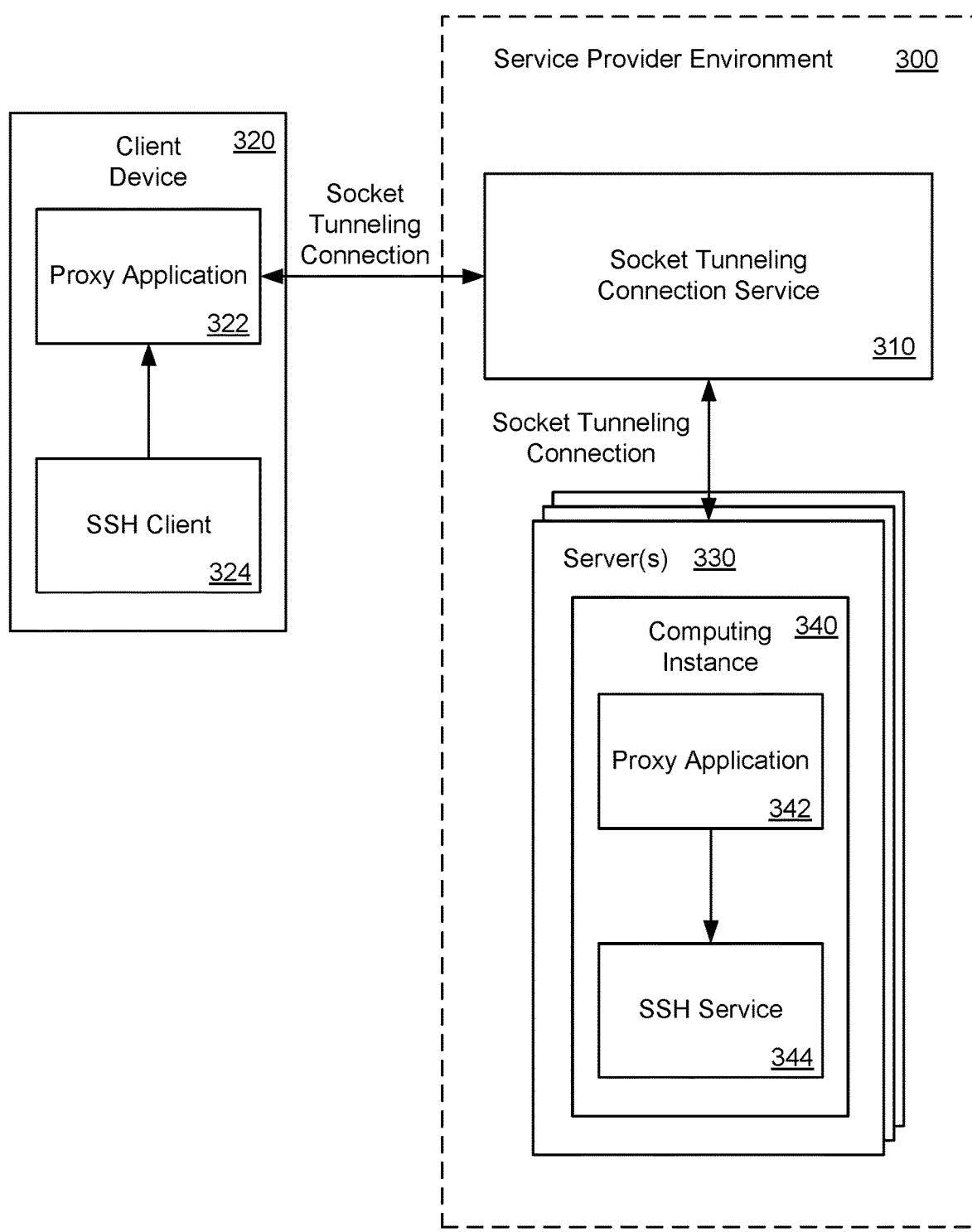
FIG. 3 illustrates a system and related operations for providing secure shell (SSH) functionality between a client device and a computing instance via a socket tunneling connection service according to an example of the present technology.

FIG. 3 illustrates an exemplary system and related operations for providing secure shell (SSH) functionality between a client device 320 and a computing instance 340 via a socket tunneling connection service 310. The socket tunneling connection service 310 may create a socket tunneling connection between the client device 320 and the computing instance 340 that enables a communication of SSH traffic between the client device 320 and the computing instance 340 via the socket tunneling connection service 310. As discussed above, an initial request may be received by the messaging service from the client device, which may trigger creation of the socket tunneling connection.

Network applications, such as SSH, may connect to services running on the computing instance 340 over the socket tunneling connection. For example, the client device 320 may include a proxy application 322 that is coupled to an SSH client 324. The computing instance 340 may include a proxy application 342 that is coupled to an SSH service 344 (e.g., an SSH daemon). The proxy application 342 on the computing instance 340 may connect to the SSH service 344 running on the computing instance 340, and the SSH client 324 on the SSH client 324 may be connected to a port that is being listened to by the proxy application 322 on the client device 320. The socket tunneling connection may be created between the proxy application 322 on the client device 320 and the proxy application 342 on the computing instance 340. The socket tunneling connection service 310 may route or direct SSH traffic over a channel between the client device 320 and the computing instance 340 over the socket tunneling connection.

In one example, the proxy application 322 running on the client device 320 may provide a "start-ssh" command to launch an SSH process. The "start-ssh" command may call a "POST tunnel" passing in an instance identifier to connect to a defined local port (e.g., port 22). The socket tunneling connection service 310 may determine whether a caller is authorized to connect to the computing instance 340. If so, the socket tunneling connection service may create a session token, send a 'create tunnel' control message with the session token to an agent running on the computing instance 340, and then upgrade a connection from the caller to the socket tunneling connection (which uses a secure web socket protocol). The "start-ssh" command may spawn the SSH service pointing to the defined local port (e.g., port 22). At this point, the proxy application 322 may forward data over the socket tunneling connection to the socket tunneling connection service 310. More specifically, data may be forwarded between a local socket connection (that utilizes TCP) and a web socket connection (on the client device 320) to the socket tunneling connection service 310. When the SSH process exits, the proxy application 322 on the client device 320 may close a secure tunneling connection to the socket tunneling connection service 310, and then the socket tunneling connection service 310 may close a corresponding secure tunneling connection to the computing instance 340.

On the computing instance 340, an agent (not shown) may start the proxy application 342, which may use the session token passed in the 'create tunnel' control message to obtain a session. Once the secure tunneling connection is open, the proxy application 342 may open a socket on the defined local port (e.g., port 22) to the SSH service 344. In other words, once a web socket connection is open, the proxy application 342 may open a local socket connection on the defined local port to the SSH service 344. At this point, the proxy application 342 on the computing instance 340 may forward data over the socket tunneling connection to the socket tunneling connection service 310. More specifically, data may be forwarded between a local socket connection and a web socket connection (on the computing instance 340) to the socket tunneling connection service 310. When either the web socket connection or the local socket connection (on the computing instance 340) closes, the proxy application 342 on the computing instance 340 may close the other socket connection and exit.

In summary, proxy applications may start listening to a local host port. Network applications (e.g., SSH) on a same machine as a proxy application may open sockets (e.g., TCP sockets) to the local host port. Messages that are sent to the local port may be received by a proxy application and forwarded to a web socket connection, and then may be sent over the socket tunneling connection to the socket tunneling connection service 310. The socket tunneling connection service 310 may receive the messages, and either delivers the messages to a recipient (when the recipient is connected to the same host) or to a socket tunneling connection service host that is connected to the recipient for delivery to the recipient. The proxy application that receives the messages may route the messages to an appropriate local socket.

In one configuration, the proxy applications 322, 342 may each open a socket tunneling connection (or secure web socket connection) with the socket tunneling connection service 310 providing the instance identifier. The socket tunneling connection service 310 may dynamically assign a client identifier (e.g., an Internet Protocol version 4 (IPv4) address) to the computing instance 340. The socket tunneling connection service 310 may record a mapping of the instance identifier to the client identifier, along with outer metadata (e.g., an account identifier associated with the computing instance 340, other client identifiers for which communication from the client is authorized).

In one configuration, clients to the socket tunneling connection service 310, such as the client device 320 and the computing instance 340, may negotiate a shared symmetric encryption key during a handshaking phase after the socket tunneling connections are established using a Diffie-Hellman key exchange. The shared symmetric encryption key may be used to encrypt data streams for that particular tunnel and the shared symmetric encryption key may be destroyed when the socket tunneling connections are terminated.

Figure 4:
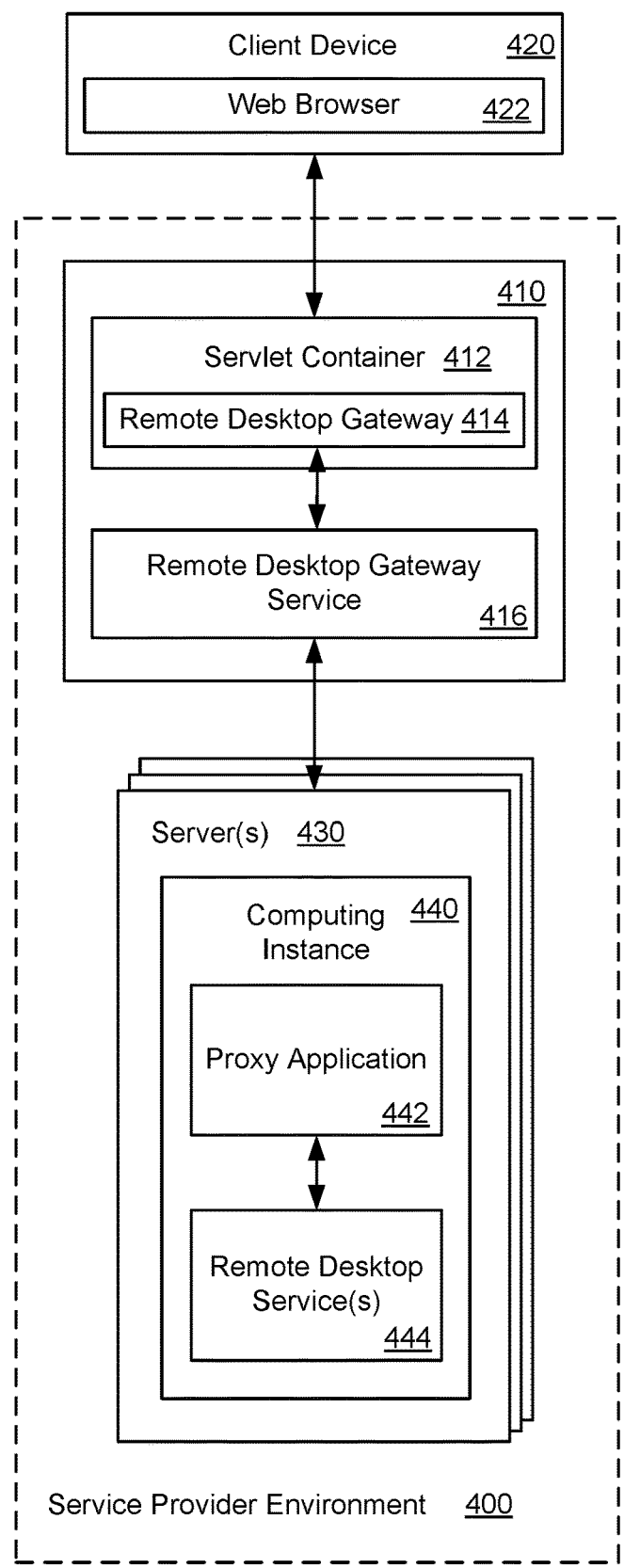
FIG. 4 illustrates a system and related operations for providing remote desktop (RDP) functionality between a client device and a computing instance via a socket tunneling connection service according to an example of the present technology.

FIG. 4 illustrates an exemplary system and related operations for providing remote desktop (RDP) functionality between a client device 420 and a computing instance 440 via a socket tunneling connection service 410. The client device 420 may include a web browser 422. The socket tunneling connection service 410 may operate a remote desktop gateway 414 in a servlet container 412. In one example, the remote desktop gateway 414 may be a clientless hypertext markup language 5 (HTML5) remote desktop gateway that is capable of providing RDP access to computers running on private networks. The remote desktop gateway 414 may support RDP, virtual network computing (VNC) and SSH protocols. For remote desktop, the remote desktop gateway 414 may provide a JavaScript control that is embeddable in a web page (that is provided to the web browser 422). In addition, the remote desktop gateway 414 may provide a remote desktop gateway service 416. The remote desktop gateway service 416 may connect to remote desktop services 444 on computing instances 440 via a proxy application 442 on the computing instance 440. The remote desktop services 444 may include terminal services client (TSC) or VNC services.

In one configuration, the socket tunneling connection service 410 may provide a RESTful API to obtain the JavaScript controls and connect to the remote desktop gateway service 416. The remote desktop gateway service 416 may be configured to use the socket tunneling connections to the computing instances 440. The RESTful APIs may implement signing and authentication and authorization before returning the JavaScript controls. The JavaScript controls may utilize the socket tunneling connections as long as the web browser 422 supports web sockets.

As shown in FIG. 4, the web browser 422 on the client device 420 may form a socket tunneling connection to the remote desktop gateway 414 operating on the socket tunneling connection service 410. The remote desktop gateway 414 may provide the remote desktop gateway service 416. The remote desktop gateway service 416 may form a socket tunneling connection to the proxy application 442 on the computing instance 440. As a result, RDP traffic may be communicated between the web browser 422 on the client device 420 and the computing instance 440 over the socket tunneling connections. The RDP traffic may traverse the remote desktop gateway 414 and the remote desktop gateway service 416 in the socket tunneling connection service 410 when being communicated between the web browser 422 and the computing instance 440 over the socket tunneling connections.

Figure 5:
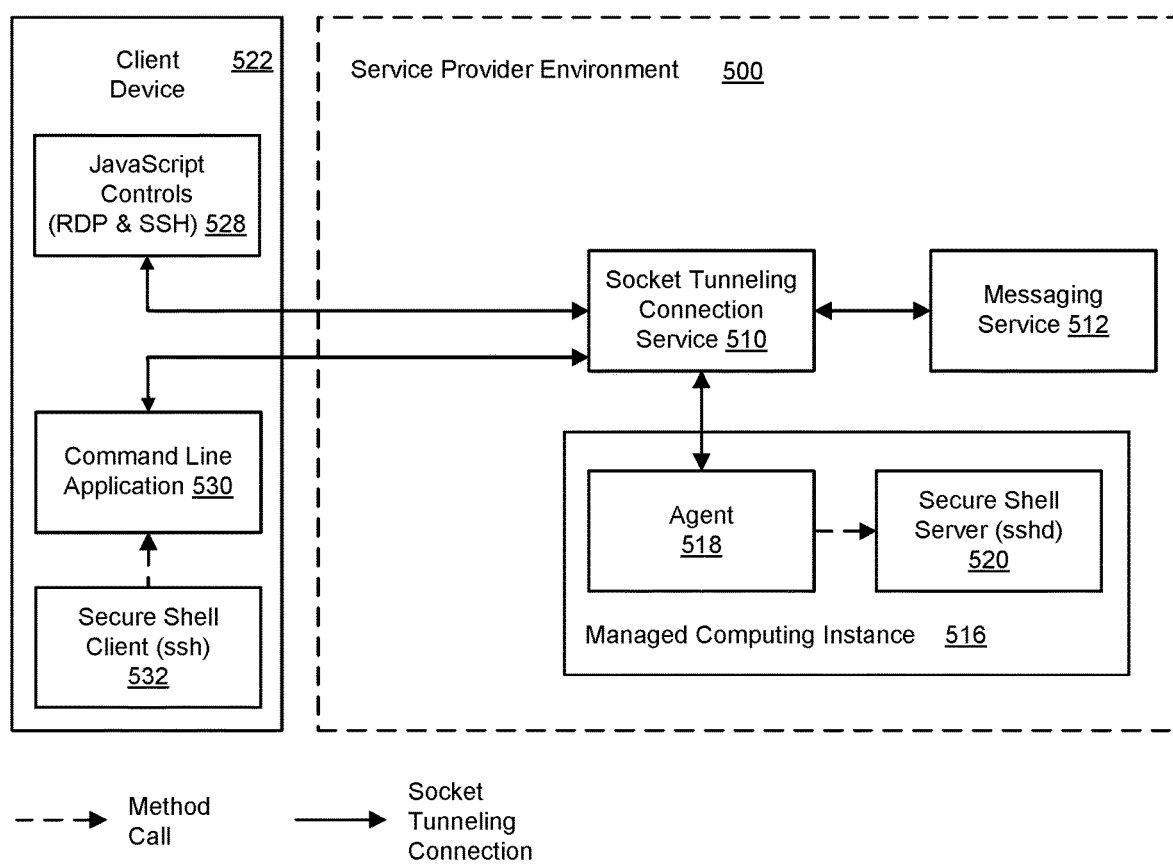
FIG. 5 illustrates a system architecture of a socket tunneling connection service and related system components according to an example of the present technology.

FIG. 5 illustrates an exemplary system architecture of a socket tunneling connection service 510 in a service provider environment 500 and related system components on a client device 522 and/or in the service provider environment 500. The socket tunneling connection service 510 may communicate with JavaScript controls 528 (e.g., RDP and SDP) on the client device 522 over a socket tunneling connection. The socket tunneling connection service 510 may also communicate with a command line application 530 on the client device 522 over a socket tunneling connection. A messaging service 512 may communicate with the socket tunneling connection service 510 over a socket tunneling connection. As previously explained, the socket tunneling connection can be an encrypted bidirectional socket connection that is open for a defined period of time. In addition, the socket tunneling connection service 510 may communicate with an agent 518 on a managed computing instance 516 over a socket tunneling connection. The agent 518 may communicate with an SSH server 520 (e.g., an SSH daemon) using method calls. Therefore, the socket tunneling connection service 510 may have separate socket tunneling connections to each of the messaging service 512, the JavaScript Controls 528 (for RDP and SSH) on the client device 522, the command line application 530 on the client device 522, and the agent 518 on the managed computing instance 516.

The socket tunneling connection service 510 may serve several functions. For example, it may create socket tunneling connections between the messaging service 512 and the agent 518 on the managed computing instance 516 and route messages between the messaging service 512 and the agent 518 over the socket tunneling connections. It may create socket tunneling connections between service clients (e.g., the client device 522 and the managed computing instance 516) to direct data using specific protocols, such as SSH and/or RDP. As another example, it may progressively streaming command output from the managed computing instance 516 to the command line application 530 running on the client device 522.

In one configuration, the socket tunneling connection service 510 may be a RESTful Java web service. Transport layer security (TLS) termination may be implemented on hosts, so communications using the socket tunneling connection service 510 may be encrypted end-to-end. Requests to the socket tunneling connection service 510 may be signed using a defined signing mechanism, and authentication and authorization may be achieved using an authentication service. The socket tunneling connection service 510 may be used as a secure web socket gateway between a plurality of web socket clients, such as the client device 522 and the managed computing instance 516. Each socket tunneling connection may contain a single point-to-point TCP session.

On the managed computing instance 516, the agent 518 may be constantly connected to the socket tunneling connection service 510 using one connection that is used to communicate with the messaging service 512. When another session is desired for a new socket tunneling connection, a control message may be sent to the agent 518 to start a proxy for the new socket tunneling connection on the managed computing instance 516, and the proxy may open the new socket tunneling connection to the socket tunneling connection service 510 for the session.

Figure 6:
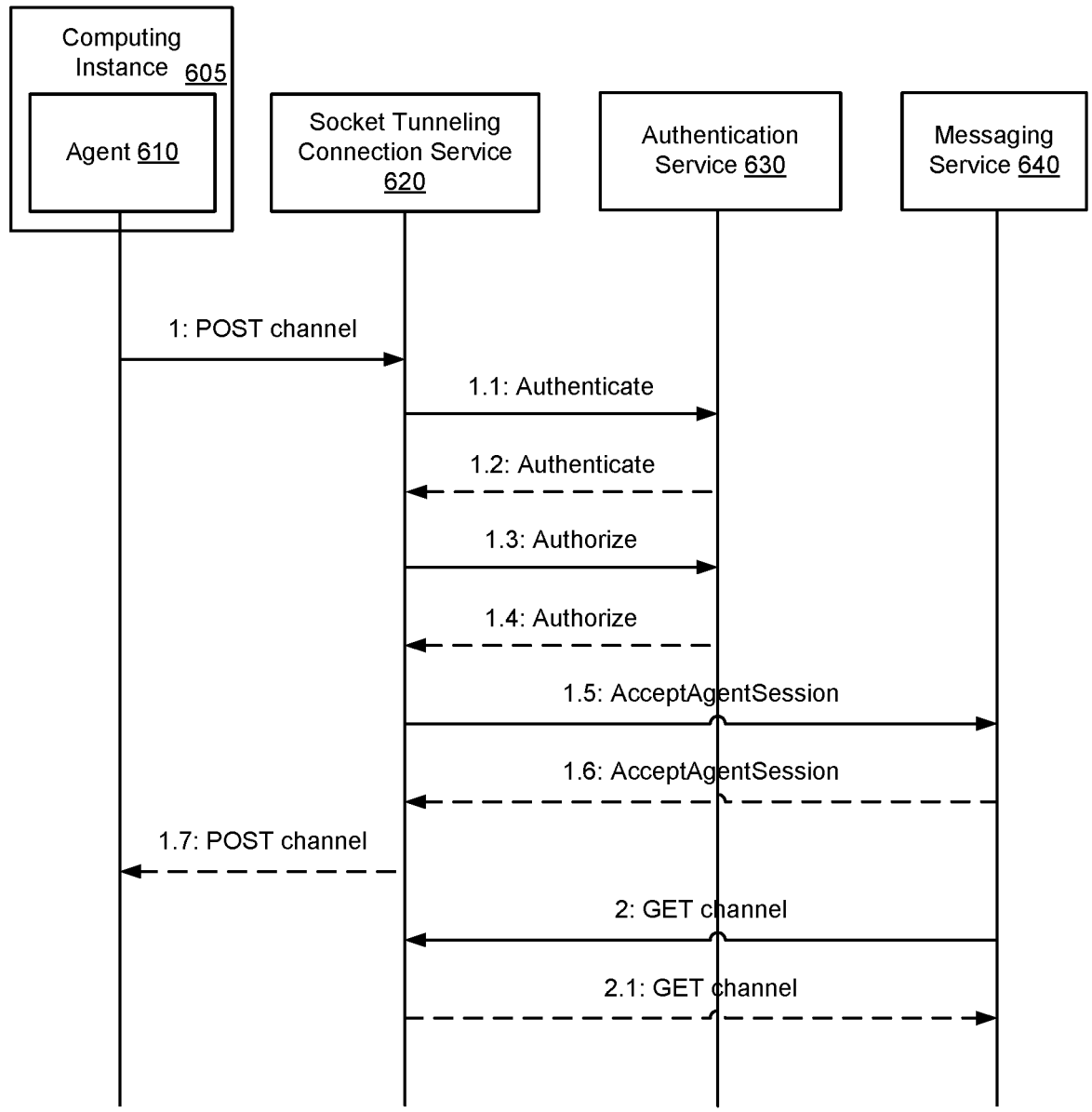
FIG. 6 illustrates operations for creating a socket tunneling connection between an agent and a messaging service according to an example of the present technology.

FIG. 6 illustrates exemplary operations for creating a socket tunneling connection (or channel) between an agent 610 on a computing instance 605 and a messaging service 640. The agent 610 may create or establish the socket tunneling connection using a 'POST channel' technique. For example, in step 1, the agent 610 may send a 'POST channel' command to a socket tunneling connection service 620. In step 1.1, the socket tunneling connection service 620 may send an 'authenticate' command to an authentication service 630, and in step 1.2, the authentication service 630 may send an 'authenticate' response to the socket tunneling connection service 620. In step 1.3, the socket tunneling connection service 620 may send an 'authorize' command to the authentication service 630, and in step 1.4, the authentication service 630 may send an 'authorize' response to the socket tunneling connection service 620. In other words, in steps 1.1 to 1.4, a caller may be authenticated and an API call may be authorized using the authentication service 630. The socket tunneling connection service 620 may determine whether there is already an existing channel. If there is no existing channel, in step 1.5, the socket tunneling connection service 620 may send an 'accept agent session' command to the messaging service 640. The 'accept agent session' command may include an encrypted token, and the messaging service 640 may utilize the encrypted token to obtain the channel. In step 1.6, the messaging service 640 may send an 'accept agent session' response to the socket tunneling connection service 620, and in step 1.7, the socket tunneling connection service 620 may send a 'POST channel' response to the agent 610. In step 2, the messaging service 640 may send a 'GET channel' command to the socket tunneling connection service 620 in order to open the socket tunneling connection to the agent 610. The 'GET channel' command may include the encrypted token that was contained in the 'accept agent session' command.

In step 2.1, the socket tunneling connection service 620 may send a 'GET channel' response to the messaging service 640, and the socket tunneling connection service 620 may upgrade an HTTPS session from the agent 610. At this point, the socket tunneling connection may be created between the agent 610 and the messaging service 640, thereby allowing the agent 610 and the messaging service 640 to communicate over socket tunneling connections. In addition, the socket tunneling connection service 620 may record web socket metadata in a domain name system (DNS) database and in local static data structures, and the socket tunneling connection service 620 may record the socket tunneling connections in a file that maps instance identifiers to the socket tunneling connections.

Figure 7:
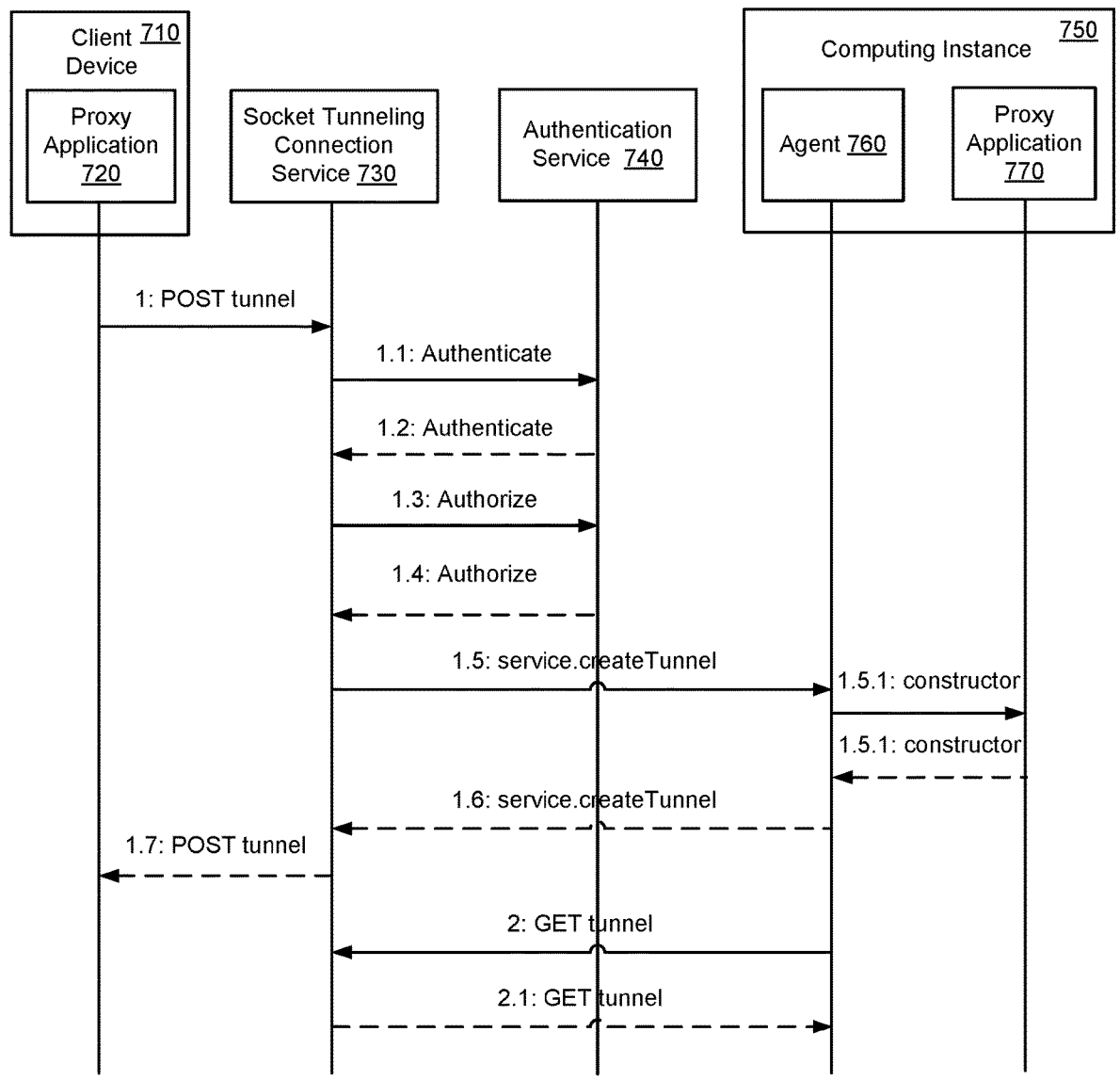
FIG. 7 illustrates operations for creating a socket tunneling connection between a client device and a computing instance according to an example of the present technology.

FIG. 7 illustrates exemplary operations for creating a socket tunneling connection (or tunnel) between a client device 710 and a computing instance 750. The client device 710 may create the socket tunneling connection using a 'POST tunnel' technique. For example, in step 1, a proxy application 720 on the client device 710 may send a 'POST tunnel' command to a socket tunneling connection service 730. In step 1.1, the socket tunneling connection service 730 may send an 'authenticate' command to an authentication service 740, and in step 1.2, the authentication service 740 may send an 'authenticate' response to the socket tunneling connection service 730. In step 1.3, the socket tunneling connection service 730 may send an 'authorize' command to the authentication service 740, and in step 1.4, the authentication service 740 may send an 'authorize' response to the socket tunneling connection service 730. In other words, in steps 1.1 to 1.4, the authentication service 740 may be used to authenticate a caller and verify that the caller has permission to open the socket tunneling connection to a local port on the computing instance 750. In addition, the socket tunneling connection service 730 may generate an encrypted token that identifies a new socket tunneling connection to be created and a valid time range for the encrypted token.

In step 1.5, when an 'open tunnel' parameter is set to true, the socket tunneling connection service 730 may send a 'create tunnel' command to an agent 760 that runs on the computing instance 750. The 'create tunnel' command may instruct the agent 760 to open the new socket tunneling connection to a local port, and the encrypted token may be passed as a field in a body of the 'create tunnel' command. The agent 760 may extract a local port number and the encrypted token from the body of the 'create tunnel' command. The agent 760 may launch a proxy application 770 on the computing instance 750. In step 1.5.1, the agent 760 may send a 'constructor' command to the proxy application 770, and in step 1.5.2, the proxy application 770 may send a 'constructor' response to the agent 760. In addition, in step 1.6, the agent 760 may send a 'create tunnel' response to the socket tunneling connection service 730.

In one example, when the 'open tunnel' parameter is set to true, the socket tunneling connection service 730 may upgrade an HTTPS POST request in order to create the new socket tunneling connection. On the other hand, when the 'open tunnel' parameter is set to false, the socket tunneling connection service 730 may return the encrypted token, and the encrypted token may be passed to a 'GET tunnel' to open the new socket tunneling connection at a later time. In step 1.7, the socket tunneling connection service 730 may send a 'POST tunnel' response to the proxy application 720 on the client device 710. In step 2, the proxy application 770 on the computing instance 750 may connect to the socket tunneling connection by sending a 'GET tunnel' command to the socket tunneling connection service 730 and opens a TCP socket on a correct port, and in step 2.1, the socket tunneling connection service 730 may send a 'GET tunnel' response to the proxy application 770 on the computing instance 750. At this point, the socket tunneling connection may be created between the agent 610 and the messaging service 640, thereby allowing the agent 610 and the messaging service 640 to communicate over socket tunneling connections.

Figure 8:
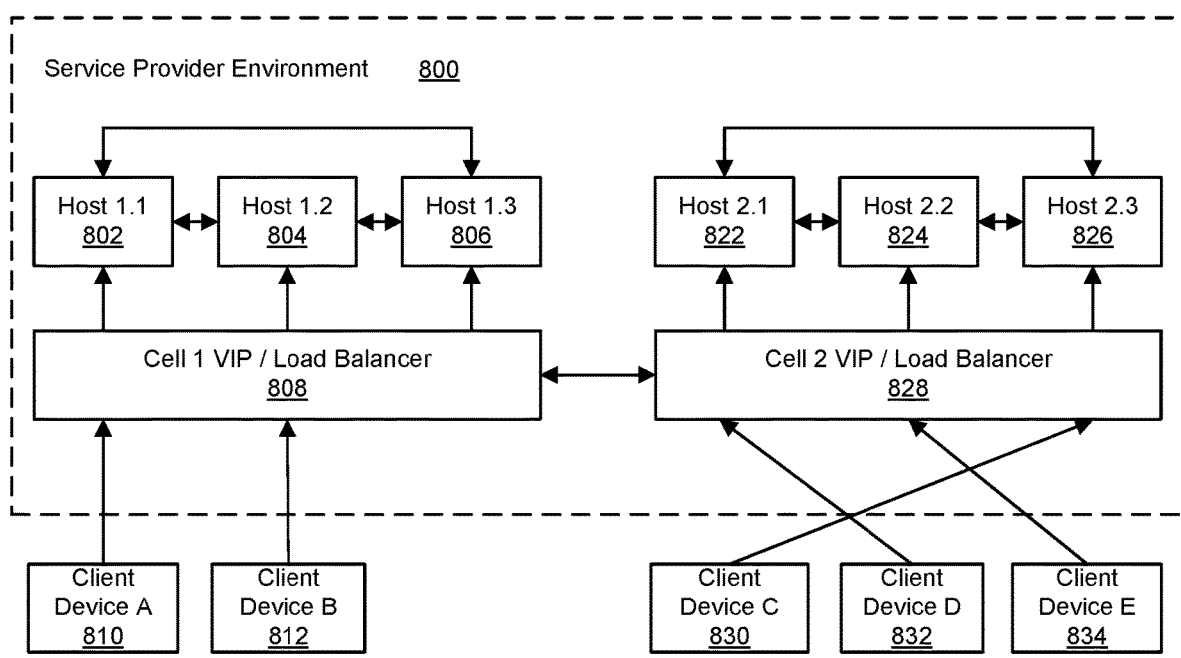
FIG. 8 illustrates connectivity between a plurality of service hosts located in a plurality of cells via socket tunneling connections according to an example of the present technology.

FIG. 8 illustrates an exemplary connectivity between a plurality of service hosts located in a plurality of cells via socket tunneling connections in a service provider environment 800. As an example, the service hosts (or socket tunneling connection service hosts) may include a first service host 802 (host 1.1), a second service host 804 (host 1.2) and a third service host (host 1.3) 806 in a first cell. The service hosts 802, 804, 806 may be connected to a first cell virtual IP (VIP) or load balancer 808, which may communicate with a plurality of client devices (e.g., client device A 810 and client device B 812). Similarly, the service hosts may include a fourth service host 822 (host 2.1), a fifth service host 824 (host 2.2) and a sixth service host (host 2.3) 826 in a second cell. The service hosts 822, 824, 826 may be connected to a second cell virtual IP (VIP) or load balancer 888, which may communicate with a plurality of client devices (e.g., client device C 830, client device D 832 and client device E 834).

In one example, the service hosts within the first cell may have a socket tunneling connection to every other service host in the first cell. In addition, the first cell may have a socket tunneling connection to the second cell, which enables service hosts within the first cell to communicate with service hosts within the second cell via the socket tunneling connections.

In one example, each client device to the socket tunneling connection service may be assigned a client identifier or address when the client device connects to the socket tunneling connection service. For example, the client identifier may be a 32-bit integer. A first 4 bits may represent a cell associated with a client device, a next 8 bits may represent an identifier of a socket tunneling connection service host that is connected to the client device, and the last 20 bits may represent a randomly assigned identifier for a socket tunneling connection in the socket tunneling connection service host. When the client device connects to the socket tunneling connection service, a mapping between the client identifier and another identifier associated with the client device (e.g., a computing instance identifier) may be stored in a database. When a new socket tunneling connection is created for the client device, the socket tunneling connection service may look up the client identifier in the database and the client identifier may be written into metadata for the new socket tunneling connection.

After creating of the socket tunneling connections, the socket tunneling connection service may route TCP byte streams between the client devices and computing instances associated with the hosts (within the same cell or located in different cells). Data to be sent over a socket tunneling connection may include a header, and the header may include a destination client device identifier (address). If a client device is attached to the same host, then the data may be sent using the host. In contrast, if the client device is attached to a different host, then the data may be sent to the different host, and then to the destination client device.

In one configuration, a maximum data rate for each socket tunneling connection may be set fairly low. For example, run command and SSH may utilize 100 kilobits per second (kbps). Graphical applications, such as RDP and VNC, may utilize a slightly increased level of bandwidth, such as 200 kbps. In one example, high bandwidth applications (e.g., for viewing videos) may not be supported by the socket tunneling connection.

Figure 9:
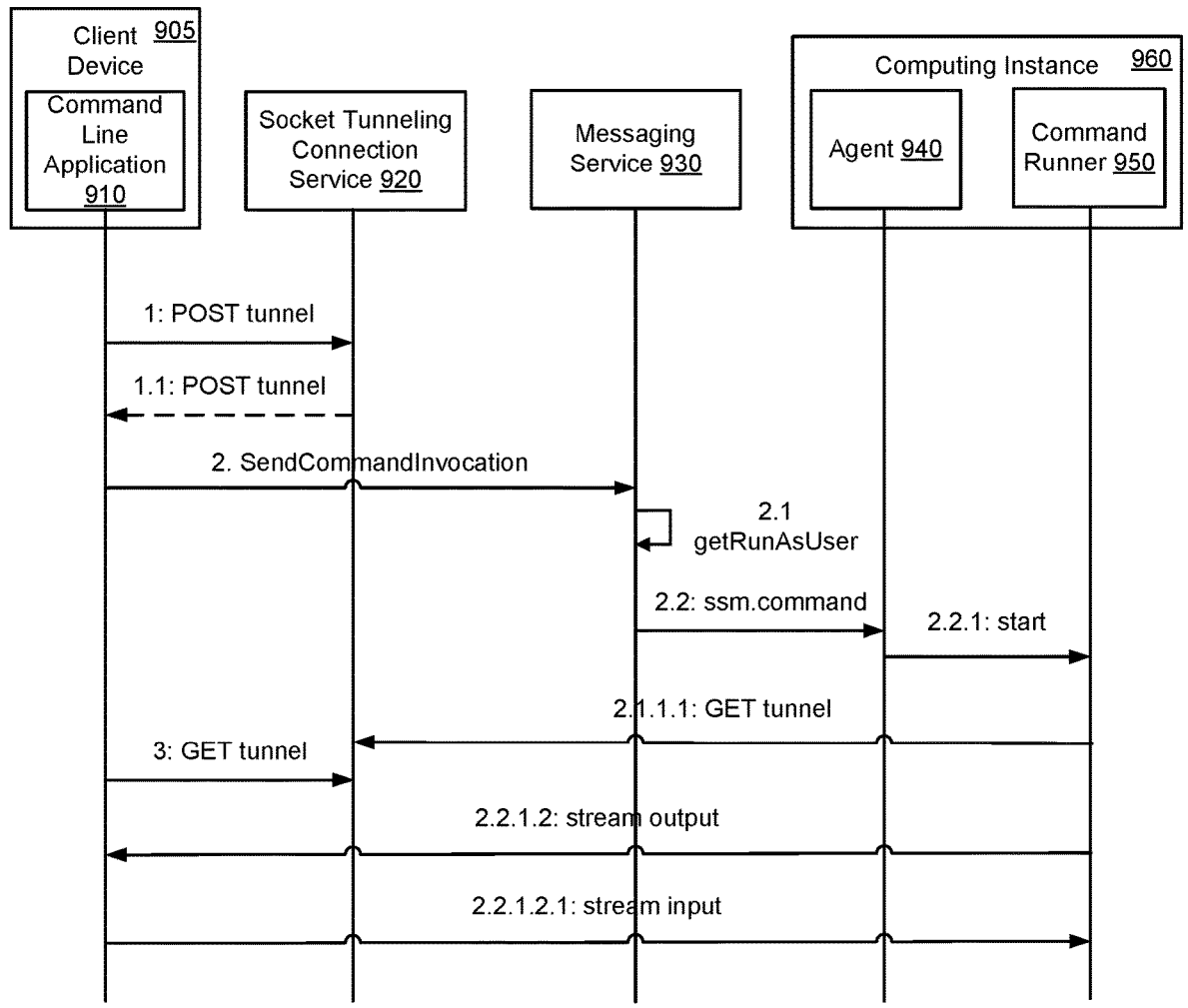
FIG. 9 illustrates operations for implementing an interactive run command feature according to an example of the present technology.

FIG. 9 illustrates exemplary operations for implementing an interactive feature for sending and running commands on computing instances, for example provided by the messaging service (e.g., an interactive run command feature). The interactive run command feature may enable customers to send a command from a client device 905 to a computing instance 960, and command output, or results from the command, may be progressively displayed on a console of the client device 905. The ability to handle a progressive output display necessitates that the client device 905 be able to handle streaming results over long-lived connections. A command line application 910 may run on the client device 905, and the command line application 910 may be configured to support the interactive run command feature. The command line application 910 may provide a 'send-command-invocation' verb to send a command to the single computing instance 960 and display the results progressively.

Referring to FIG. 9, a process for sending an interactive command may involve a series of steps. For example, a customer may start the command line application 910 to run an interactive command on a particular computing instance 960. In step 1, the command line application 910 may send a 'POST tunnel' command to a socket tunneling connection service 920 in order to create a socket tunneling connection to the computing instance 960. The 'POST tunnel' command may indicate that an 'openTunnel query' parameter is false. The socket tunneling connection service 920 may send a 'POST tunnel' response to the command line application 910. The 'POST tunnel' response may include a tunnel token that is usable to open the socket tunneling connection. In step 2, the command line application 910 may send a 'send command invocation' command to a messaging service 930. The 'send command invocation' command may pass the tunnel token in a 'tunnel' parameter as an encoded string.

In step 2.1, the messaging service 930 may call an access management service (not shown) to authenticate a caller and verify that the caller has permission to call the 'send command invocation' to the computing instance 960. The messaging service 930 may obtain a local or domain principal associated with the caller's access management user that is to be used when executing the interactive command. In step 2.2, the messaging service 930 may send a 'command' message to an agent 940 running on the computing instance 960. The 'command' message may include the tunnel token and the local security principal. The computing instance 960 may start a proxy application (not shown) running as a 'RunAs' security principal. In step 2.2.1, the agent 940 may send a 'start' command to a command runner 950 on the computing instance 960. The command runner 950 may function to execute interactive commands received from the command line application 910 (after the socket tunneling connection is created). In step 2.2.1.1, the command runner 950 may send a 'GET tunnel' command to the socket tunneling connection service 920, which may serve to open the socket tunneling connection, and in step 3, the command line application 910 may send a 'GET tunnel' command to the socket tunneling connection service 920 using the tunnel token. The command line application 910 and the proxy application (on the computing instance 960) may negotiate a symmetric key and use the symmetric key to encrypt socket tunneling communications end-to-end. The command runner 950 on the computing instance 960 may execute the interactive command, and in step 2.2.1.2, the command runner 950 may provide a command stream output to the command line application 910 over the socket tunneling connection. More specifically, the proxy application on the computing instance 960 may upload command output every 500-1000 milliseconds (ms) to a web socket connection, and the command output may be provided as a stream to the command line application 910. In addition, in step 2.2.1.2.1, the command line application 910 may provide a command stream input to the command runner 950.

Figure 10:
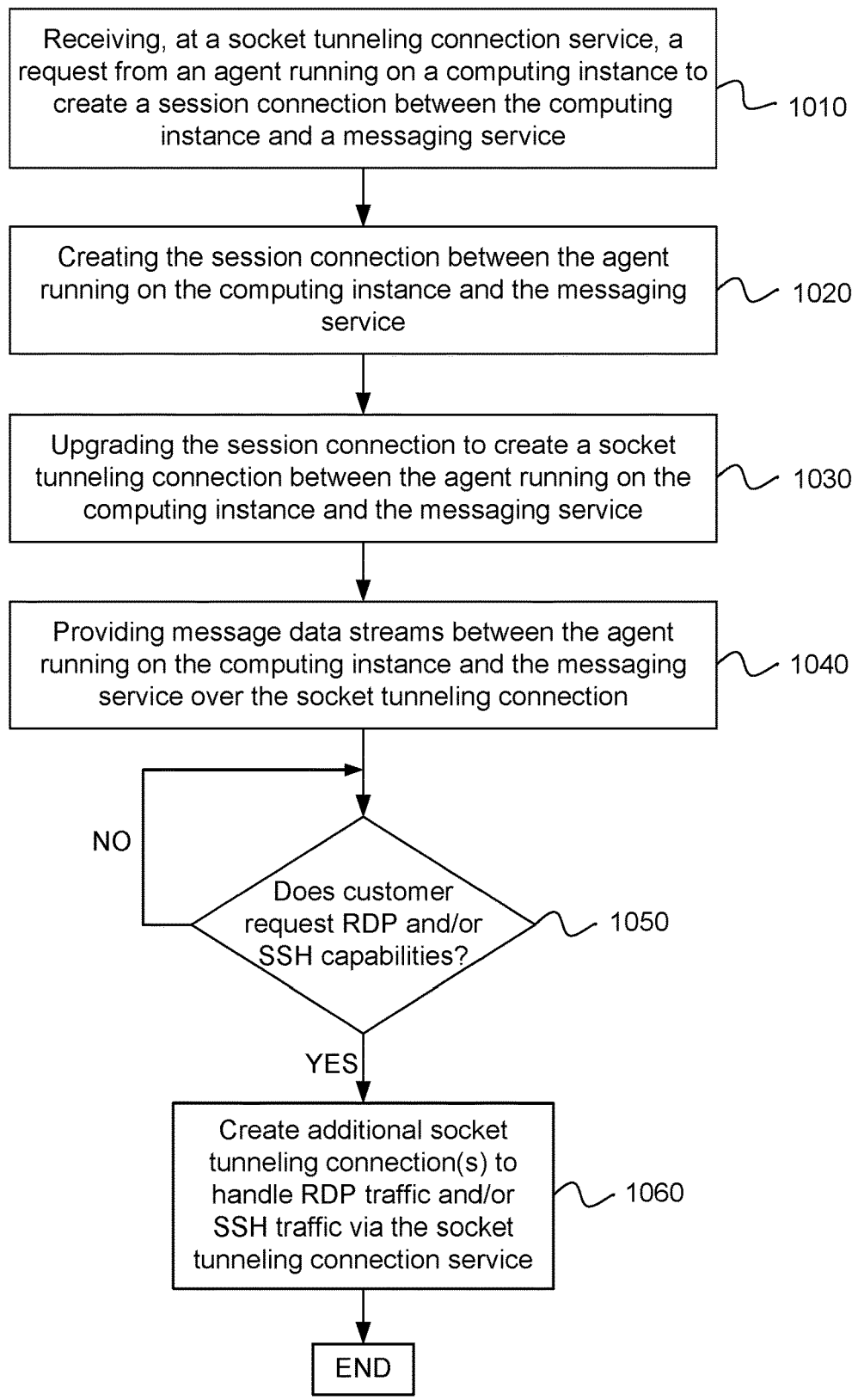
FIG. 10 is a flowchart of an example method creating socket tunneling connections between computing instances and a messaging service via a socket tunneling connection service.

FIG. 10 illustrates an example of a method for creating socket tunneling connections between computing instances and a messaging service via a socket tunneling connection service. A request may be received at the socket tunneling connection service that operates in a computing service environment, as in block 1010. The request may be from an agent running on a computing instance. The request may be to create a session connection between the computing instance and the messaging service that operates in the computing service environment. The request to create the session connection between the computing instance and the messaging service may be a hypertext transfer protocol (HTTP) request. Alternatively, a request may be received at the socket tunneling connection service from the client device to create a session connection between the client device and the computing instance via the socket tunneling connection service. For example, the client device may send a command to the messaging service, which may trigger the requests to create the socket tunneling connections. In addition, the client device may request the session connection with the computing instance in order to send an interactive run command to the computing instance over the session connection.

The session connection may be created between the agent running on the computing instance and the messaging service, as in block 1020. The session connection may be created using the socket tunneling connection service. However, at this point, the session connection may not be a socket tunneling connection. Alternatively, the session connection may be created between the client device and the computing instance via the socket tunneling connection service.

The session connection may be upgraded to create the socket tunneling connection between the agent running on the computing instance and the messaging service, as in block 1030. The session connection may be upgraded to the socket tunneling connection using the socket tunneling connection service. The session connection may be upgraded based on a parameter setting included in the request. Alternatively, the socket tunneling connection may be created between the client device and the computing instance via the socket tunneling connection service. The socket tunneling connection may be an encrypted bidirectional socket connection that is open for a defined period of time.

Message data streams may be provided between the agent running on the computing instance and the messaging service over the socket tunneling connection, as in block 1040. The message data streams may be provided via the socket tunneling connection service. In other words, the socket tunneling connection service may serve as an intermediary between the agent running on the computing instance and the messaging service. Alternatively, when the socket tunneling connection is created between the client device and the computing instance, the socket tunneling connection service may forward interactive run commands received from the client device to the computing instance.

In one configuration, the socket tunneling connection service may determine whether a customer requests a remote desktop (RDP) and/or secure shell (SSH) capability between a client device and the computing instance, as in block 1050.

When the customer does request the RDP and/or SSH capability, the socket tunneling connection service may create separate socket tunneling connection(s) for the client device to handle RDP traffic and/or SSH traffic between the client device and the computing instance via the socket tunneling connection service, as in block 1060.

In one example, the socket tunneling connection service may create a second socket tunneling connection between a client device that runs a SSH client and a proxy application that is configured to execute on the computing instance via the socket tunneling connection service. The second socket tunneling connection may enable the client device and the computing instance to communicate SSH traffic via the socket tunneling connection service.

In another example, the socket tunneling connection service may create a second socket tunneling connection between a client device that runs a web browser and a proxy application that runs on the computing instance via the socket tunneling connection service. The second socket tunneling connection may enable the client device and the computing instance to communicate RDP traffic via the socket tunneling connection service.

In one example, the socket tunneling connection service may provide an interactive run command from a command line application running on a client device to the computing instance over a second socket tunneling connection between the command line application and the computing instance via the socket tunneling connection service. Command output resulting from an execution of the interactive run command at the computing instance may be streamed over the second socket tunneling connection via the socket tunneling connection service to the client device for display. In addition, the command line application may be configured to receive the command output over the second socket tunneling connection. In other words, the socket tunneling connection service may forward the interactive run command received from the command line application running on the client device to the computing instance over the second socket tunneling connection created between the client device and the computing instance via the socket tunneling connection service. In addition, the socket tunneling connection service may forward a return stream of command output received from the computing instance over the second socket tunneling connection to the client device, and the stream of command output may result from an execution of the interactive run command at the computing instance.

In one configuration, commands may be provided over the socket tunneling connection to the computing instance that is running on a virtual private cloud (VPC) in the computing service environment, and inbound ports may not be used on the computing instance or the VPC due to the usage of the socket tunneling connection. In another configuration, commands may be provided over the socket tunneling connection to a computing instance that is running in an on premise data center, and inbound ports may not be used for a firewall associated with the on premise data center due to the usage of the socket tunneling connection.

Figure 11:
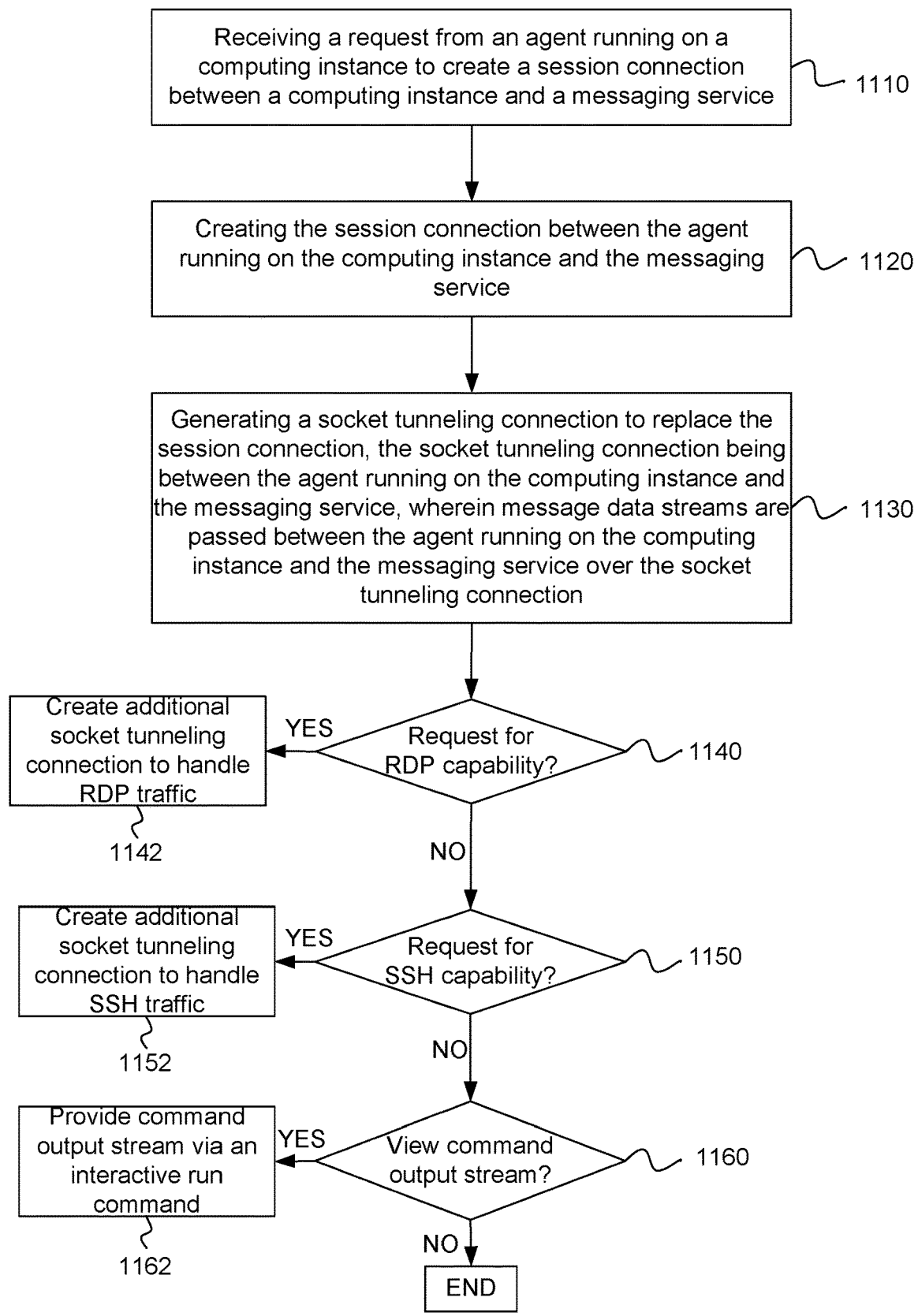
FIG. 11 is a flowchart of an example method for creating socket tunneling connections in a service provider environment.

FIG. 11 illustrates an example of a method for creating socket tunneling connections. A request may be received from an agent running on a computing instance to create a session connection between a computing instance and a messaging service that operates in a computing service environment, as in block 1110. The request to create the session connection between the computing instance and the messaging service may be a hypertext transfer protocol secure (HTTPS) request. The request may be initiated by a client device, as discussed above.

The session connection may be created between the agent running on the computing instance and the messaging service, as in block 1120. The session connection created between the agent and the messaging service may provide limited capabilities. The session connection may not provide capabilities associated with, for example, a socket tunneling connection.

A socket tunneling connection may be generated to replace the session connection, as in block 1130. The socket tunneling connection may be generated using a socket tunneling connection service. The socket tunneling connection may be between the agent running on the computing instance and the messaging service. The socket tunneling connection may be an encrypted bidirectional socket connection that is open for a defined period of time between the agent running on the computing instance and the messaging service via the socket tunneling connection service.

In one example, the socket tunneling connection service may determine whether a customer requests a remote desktop (RDP) capability, as in block 1140. When the customer does request the RDP capability, the socket tunneling connection service may create a separate socket tunneling connection to handle RDP traffic, as in block 1142. In another example, the socket tunneling connection service may determine whether a customer requests a secure shell (SSH) capability, as in block 1150. When the customer does request the SSH capability, the socket tunneling connection service may create a separate socket tunneling connection to handle SSH traffic, as in block 1152. In yet another example, the socket tunneling connection service may determine whether a customer selects a setting to view a stream of command output, as in block 1160. When the customer does select the setting to view the stream of command output, the socket tunneling connection service may provide the stream of command output via an interactive run command that is launched on a client device, as in block 1162

In one example, message data streams may be passed between the agent running on the computing instance and the messaging service over the socket tunneling connection via the socket tunneling connection service. The agent may route messages in the message data streams to an appropriate agent subsystem.

In one example, the socket tunneling connection may be generated to replace the session connection using an HTTPS upgrade mechanism. In another example, the socket tunneling connection between the agent running on the computing instance and the messaging service utilizes a transmission control protocol (TCP). In yet another example, the socket tunneling connection may be encrypted using a shared symmetric encryption key that is negotiated during a setup phase after the socket tunneling connection is established. The shared symmetric encryption key may be used to encrypt message data streams sent over the socket tunneling connection, and the shared symmetric encryption key may be deleted when the socket tunneling connection is terminated. Alternatively, a customer may define the symmetric encryption key in advance and a key management service may be used to distribute the symmetric encryption key to the client device and the computing instance.

In one configuration, the socket tunneling connection service may direct non-transmission control protocol (non-TCP) traffic over a second socket tunneling connection between a proxy application running on the computing instance and a client device that runs a secure shell (SSH) client. The non-TCP traffic may include SSH traffic. In addition, the SSH traffic may be authenticated using an authentication service.

In another configuration, the socket tunneling connection service may direct non-transmission control protocol (non-TCP) traffic over a second socket tunneling connection between a proxy application running on the computing instance and a client device that runs a web browser. The non-TCP traffic may include remote desktop (RDP) traffic. In addition, the RDP traffic may be authenticated using an authentication service.

In one example, the socket tunneling connection service may provide an interactive run command that enables a command to be sent from a command line application running on a client device to the computing instance over a second socket tunneling connection between the command line application and the computing instance. Command output may be streamed over the second socket tunneling connection to the client device for display. In other words, the interactive run command received from the client device may be forwarded to the computing instance over the second socket tunneling connection created between the client device and the computing instance. In addition, command output received from the computing instance may be forwarded over the second socket tunneling connection to the client device, and the command output may result from an execution of the interactive run command at the computing instance.

In another example, the socket tunneling connection service may establish socket tunneling connections between a plurality of socket tunneling connection service hosts located within a defined cell. In addition, the socket tunneling connection service may establish socket tunneling connections between a plurality of socket tunneling connection service hosts located in multiple cells.

In yet another example, the socket tunneling connection service may assign a client identifier to a client that connects to a socket tunneling connection service. The client identifier may include: a first set of bits to represent a cell associated with the client, a second set of bits to represent an identifier of a socket tunneling connection service host that is connected to the client, and a third set of bits to represent a randomly assigned identifier for a socket tunneling connection in the socket tunneling connection service host.

Figure 12:
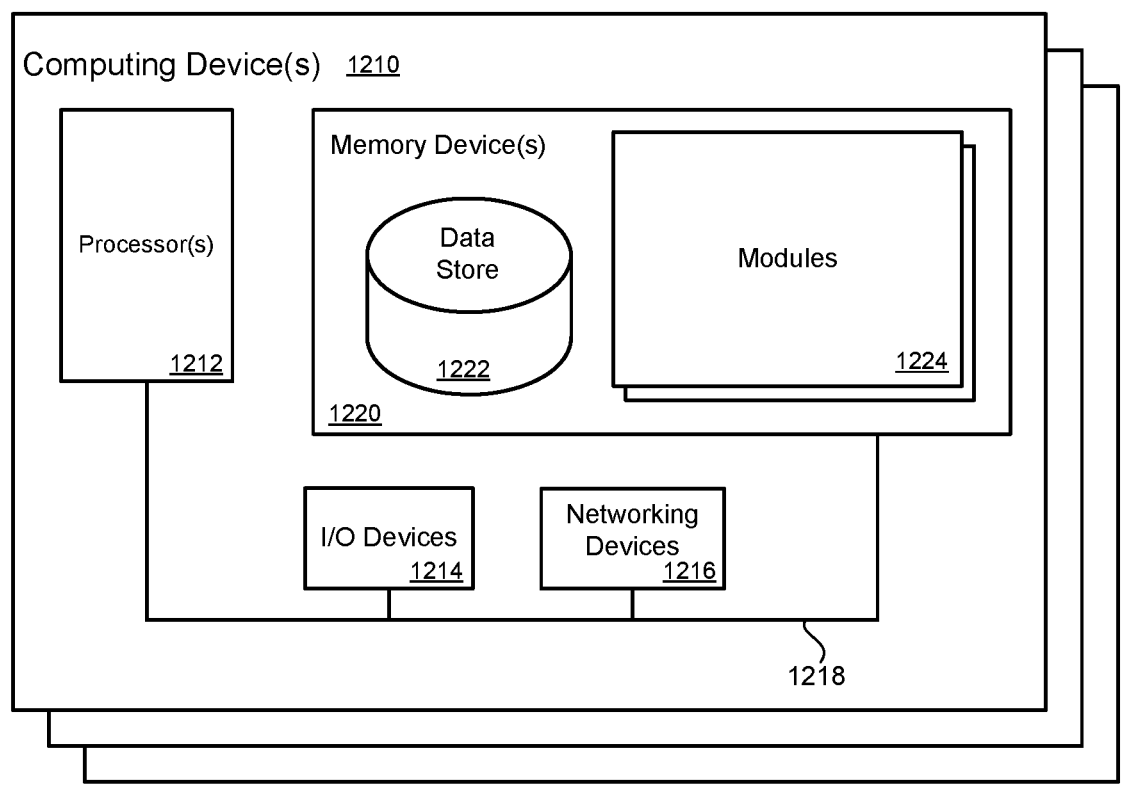
FIG. 12 is a block diagram that provides an example illustration of a computing device that may be employed in the present technology.

FIG. 12 illustrates a computing device 1210 on which modules of this technology may execute. A computing device 1210 is illustrated on which a high level example of the technology may be executed. The computing device 1210 may include one or more processors 1212 that are in communication with memory devices 1220. The computing device may include a local communication interface 1218 for the components in the computing device. For example, the local communication interface may be a local data bus and/or any related address or control busses as may be desired.

The memory device 1220 may contain modules 1224 that are executable by the processor(s) 1212 and data for the modules 1224. The modules 1224 may execute the functions described earlier. A data store 1222 may also be located in the memory device 1220 for storing data related to the modules 1224 and other applications along with an operating system that is executable by the processor(s) 1212.

Other applications may also be stored in the memory device 1220 and may be executable by the processor(s) 1212. Components or modules discussed in this description that may be implemented in the form of software using high programming level languages that are compiled, interpreted or executed using a hybrid of the methods.

The computing device may also have access to I/O (input/output) devices 1214 that are usable by the computing devices. An example of an I/O device is a display screen that is available to display output from the computing devices. Other known I/O device may be used with the computing device as desired. Networking devices 1216 and similar communication devices may be included in the computing device. The networking devices 1216 may be wired or wireless networking devices that connect to the internet, a LAN, WAN, or other computing network.

The components or modules that are shown as being stored in the memory device 1220 may be executed by the processor 1212. The term "executable" may mean a program file that is in a form that may be executed by a processor 1212. For example, a program in a higher level language may be compiled into machine code in a format that may be loaded into a random access portion of the memory device 1220 and executed by the processor 1212, or source code may be loaded by another executable program and interpreted to generate instructions in a random access portion of the memory to be executed by a processor. The executable program may be stored in any portion or component of the memory device 1220. For example, the memory device 1220 may be random access memory (RAM), read only memory (ROM), flash memory, a solid state drive, memory card, a hard drive, optical disk, floppy disk, magnetic tape, or any other memory components.

The processor 1212 may represent multiple processors and the memory 1220 may represent multiple memory units that operate in parallel to the processing circuits. This may provide parallel processing channels for the processes and data in the system. The local interface 1218 may be used as a network to facilitate communication between any of the multiple processors and multiple memories. The local interface 1218 may use additional systems designed for coordinating communication such as load balancing, bulk data transfer, and similar systems.

Figure 13:
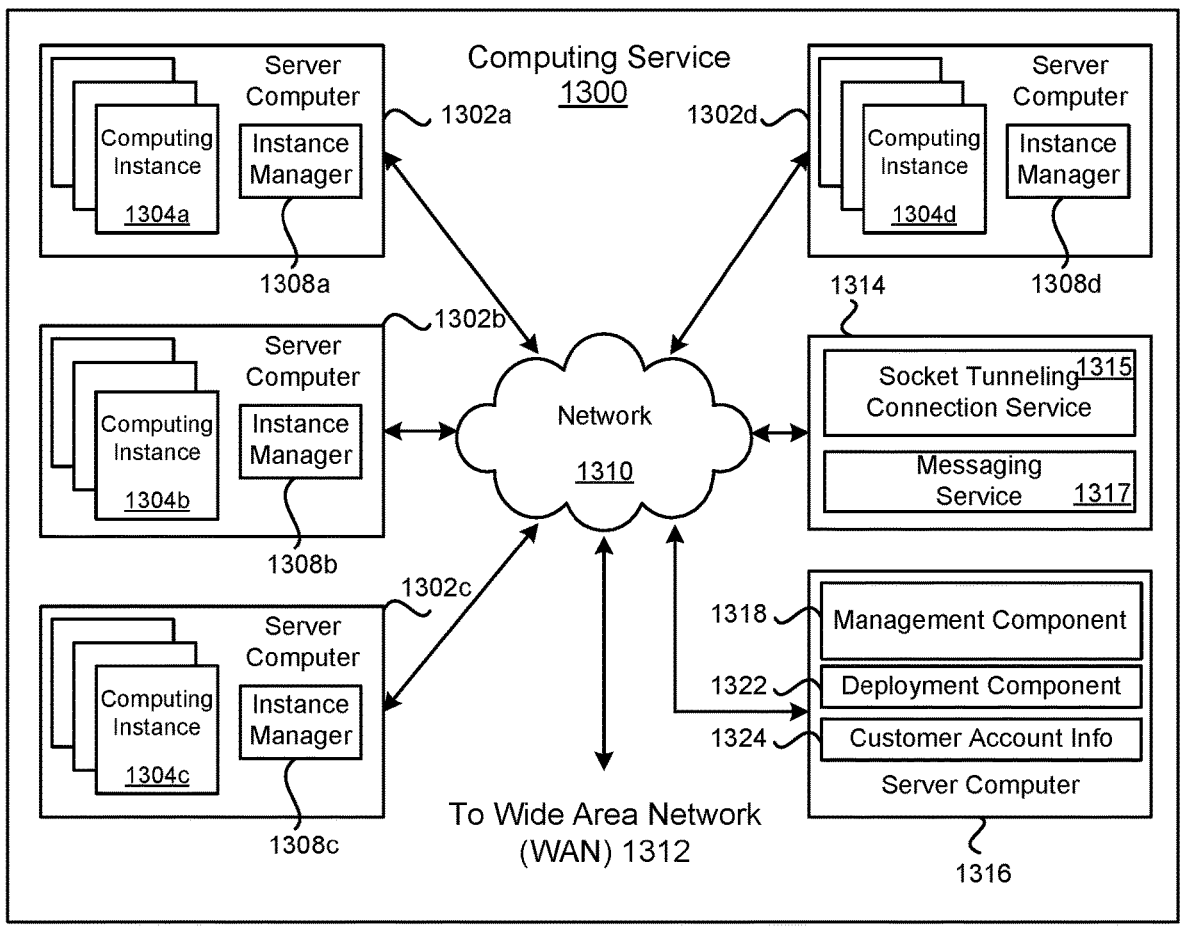
FIG. 13 is a block diagram of a service provider environment according to an example of the present technology.

FIG. 13 is a block diagram illustrating an example computing service 1300 that may be used to execute and manage a number of computing instances 1304a-d upon which the present technology may execute. In particular, the computing service 1300 depicted illustrates one environment in which the technology described herein may be used. The computing service 1300 may be one type of environment that includes various virtualized service resources that may be used, for instance, to host computing instances 1304a-d.

The computing service 1300 may be capable of delivery of computing, storage and networking capacity as a software service to a community of end recipients. In one example, the computing service 1300 may be established for an organization by or on behalf of the organization. That is, the computing service 1300 may offer a "private cloud environment." In another example, the computing service 1300 may support a multi-tenant environment, wherein a plurality of customers may operate independently (i.e., a public cloud environment). Generally speaking, the computing service 1300 may provide the following models: Infrastructure as a Service ("IaaS"), Platform as a Service ("PaaS"), and/or Software as a Service ("SaaS"). Other models may be provided. For the IaaS model, the computing service 1300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 1300. End customers may access the computing service 1300 using networked client devices, such as desktop computers, laptops, tablets, smartphones, etc. running web browsers or other lightweight client applications, for example. Those familiar with the art will recognize that the computing service 1300 may be described as a "cloud" environment.

The particularly illustrated computing service 1300 may include a plurality of server computers 1302a-d. The server computers 1302a-d may also be known as physical hosts. While four server computers are shown, any number may be used, and large data centers may include thousands of server computers. The computing service 1300 may provide computing resources for executing computing instances 1304a-d. Computing instances 1304a-d may, for example, be virtual machines. A virtual machine may be an instance of a software implementation of a machine (i.e. a computer) that executes applications like a physical machine. In the example of a virtual machine, each of the server computers 1302a-d may be configured to execute an instance manager 1308a-d capable of executing the instances. The instance manager 1308a-d may be a hypervisor, virtual machine manager (VMM), or another type of program configured to enable the execution of multiple computing instances 1304a-d on a single server. Additionally, each of the computing instances 1304a-d may be configured to execute one or more applications.

A server 1314 may be reserved to execute software components for implementing the present technology or managing the operation of the computing service 1300 and the computing instances 1304a-d. For example, the server computer 1314 may execute a socket tunneling connection service 1315 operable to create socket tunneling connections between computing instances 1304a-d and a messaging service 317 via the socket tunneling connection service 315. The socket tunneling connection service 1315 may receive a request from an agent running on a computing instance to create a session connection between the computing instance and the messaging service 317. The socket tunneling connection service 1315 may create the session connection between the agent running on the computing instance and the messaging service 317. The socket tunneling connection service 1315 may upgrade the session connection to create a socket tunneling connection between the agent running on the computing instance and the messaging service 317. The socket tunneling connection may be an encrypted bidirectional socket connection that is open for a defined period of time between the agent running on the computing instance and the messaging service 317 via the socket tunneling connection service. The socket tunneling connection service 1315 may provide message data streams between the agent running on the computing instance and the messaging service 317 over the socket tunneling connection.

A server computer 1316 may execute a management component 1318. A customer may access the management component 1318 to configure various aspects of the operation of the computing instances 1304a-d purchased by a customer. For example, the customer may setup computing instances 1304a-d and make changes to the configuration of the computing instances 1304a-d.

A deployment component 1322 may be used to assist customers in the deployment of computing instances 1304a-d. The deployment component 1322 may have access to account information associated with the computing instances 1304a-d, such as the name of an owner of the account, credit card information, country of the owner, etc. The deployment component 1322 may receive a configuration from a customer that includes data describing how computing instances 1304a-d may be configured. For example, the configuration may include an operating system, provide one or more applications to be installed in computing instances 1304a-d, provide scripts and/or other types of code to be executed for configuring computing instances 1304a-d, provide cache logic specifying how an application cache is to be prepared, and other types of information. The deployment component 1322 may utilize the customer-provided configuration and cache logic to configure, prime, and launch computing instances 1304a-d. The configuration, cache logic, and other information may be specified by a customer accessing the management component 1318 or by providing this information directly to the deployment component 1322.

Customer account information 1324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 1324 may also include security information used in encryption of asynchronous responses to API requests. By "asynchronous" it is meant that the API response may be made at any time after the initial request and with a different network connection.

A network 1310 may be utilized to interconnect the computing service 1300 and the server computers 1302a-d, 1316. The network 1310 may be a local area network (LAN) and may be connected to a Wide Area Network (WAN) 1312 or the Internet, so that end customers may access the computing service 1300. In addition, the network 1310 may include a virtual network overlaid on the physical network to provide communications between the servers 1302a-d. The network topology illustrated in FIG. 13 has been simplified, as many more networks and networking devices may be utilized to interconnect the various computing systems disclosed herein.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions being executed by one or more processors to create socket tunneling connections between computing instances and a messaging service via a socket tunneling connection service, comprising:
    receiving, at the socket tunneling connection service that operates in a computing service environment, a request from an agent running on a computing instance to create a session connection between the computing instance and the messaging service that operates in the computing service environment;
    creating, at the socket tunneling connection service, the session connection between the agent running on the computing instance and the messaging service;
    upgrading, at the socket tunneling connection service, the session connection to create a socket tunneling connection between the agent running on the computing instance and the messaging service, wherein the session connection is upgraded based on a parameter setting included in the request, and the socket tunneling connection is an encrypted bidirectional socket connection that is open for a period of time between the agent running on the computing instance and the messaging service via the socket tunneling connection service;
    sending, via the socket tunneling connection service, message data streams between the agent running on the computing instance and the messaging service over the socket tunneling connection;
    creating a second socket tunneling connection between a client device and the computing instance to enable non-transmission control protocol (non-TCP) traffic to be communicated between the client device and the computing instance;
    forwarding, via the socket tunneling connection service, a command received from a command line application running on the client device to the computing instance, the command received over the second socket tunneling connection; and
    forwarding, via the socket tunneling connection service, a stream of command output received from the computing instance over the second socket tunneling connection to the client device, wherein the stream of command output results from an execution of the command at the computing instance.

2. The non-transitory machine readable storage medium of claim 1, further comprising creating the second socket tunneling connection between the client device that runs a secure shell (SSH) client and a proxy application that runs on the computing instance, and the second socket tunneling connection enables the client device and the computing instance to communicate the non-TCP traffic including SSH traffic.

3. The non-transitory machine readable storage medium of claim 1, further comprising creating the second socket tunneling connection between the client device that runs a web browser and a proxy application that is configured to execute on the computing instance, and the second socket tunneling connection enables the client device and the computing instance to communicate the non-TCP traffic including remote desktop (RDP) traffic.

4. The non-transitory machine readable storage medium of claim 1, wherein:
    the computing instance is running on a virtual private cloud (VPC) in the computing service environment; or
    the computing instance is running in an on premise data center.

5. A computer implemented method, comprising:
    receiving a request to create a session connection with a messaging service that operates in a computing service environment;
    creating the session connection between an agent running on a computing instance and the messaging service;
    generating, using a socket tunneling connection service, a socket tunneling connection to replace the session connection, the socket tunneling connection being between the agent running on the computing instance and the messaging service, wherein message data streams are passed between the agent running on the computing instance and the messaging service over the socket tunneling connection via the socket tunneling connection service;
    creating a second socket tunneling connection between a client device and the computing instance to enable non-transmission control protocol (non-TCP) traffic to be communicated between the client device and the computing instance;
    forwarding an instruction received from the client device, at the socket tunneling connection service, over the second socket tunneling connection; and
    forwarding command output received from the computing instance over the second socket tunneling connection, wherein the command output results from an execution of the instruction at the computing instance.

6. The method of claim 5, further comprising creating the second socket tunneling connection using the socket tunneling connection service.

7. The method of claim 5, further comprising:
    receiving the request to create the session connection with the messaging service from the client device; and
    forwarding the command output received from the computing instance over the second socket tunneling connection to the client device.

8. The method of claim 5, wherein the socket tunneling connection between the agent and the messaging service utilizes a transmission control protocol (TCP).

9. The method of claim 5, further comprising directing the non-TCP traffic over the second socket tunneling connection between a proxy application running on the computing instance and the client device that runs a secure shell (SSH) client, wherein the non-TCP traffic includes SSH traffic, and the SSH traffic is authenticated using an authentication service.

10. The method of claim 5, further comprising directing the non-TCP traffic over the second socket tunneling connection between a proxy application running on the computing instance and the client device that runs a web browser, wherein the non-TCP traffic includes the RDP traffic, and the RDP traffic is authenticated using an authentication service.

11. The method of claim 5, wherein:
the computing instance is running on a virtual private cloud (VPC) in the computing service environment; or
the computing instance is running in an on premise data center.

12. The method of claim 5, wherein the socket tunneling connection is encrypted using a shared symmetric encryption key that is negotiated during a setup phase after the socket tunneling connection is established, wherein the shared symmetric encryption key is used to encrypt message data streams sent over the socket tunneling connection, and the shared symmetric encryption key is deleted after termination of the socket tunneling connection.

13. The method of claim 5, wherein the socket tunneling connection is an encrypted bidirectional socket connection that is open for a period of time between the agent and the messaging service via a socket tunneling connection service.

14. The method of claim 5, wherein:
the request to create the session connection between the computing instance and the messaging service is a hypertext transfer protocol secure (HTTPS) request; and
the socket tunneling connection is generated to replace the session connection using an HTTPS upgrade mechanism.

15. The method of claim 5, further comprising:
establishing socket tunneling connections between a plurality of socket tunneling connection service hosts located within a defined cell; and
establishing socket tunneling connections between a plurality of socket tunneling connection service hosts located in multiple cells.

16. The method of claim 5, further comprising assigning a client identifier to the client device that connects to a socket tunneling connection service, wherein the client identifier comprises: a first set of bits to represent a cell associated with the client, a second set of bits to represent an identifier of a socket tunneling connection service host that is connected to the client, and a third set of bits to represent a randomly assigned identifier for a socket tunneling connection in the socket tunneling connection service host.

17. A system for creating socket tunneling connections in a computing service environment, the system comprising:
at least one processor;
at least one memory device including a data store to store a plurality of data and instructions that, when executed, cause the system to:
receive a request to create a session connection with a messaging service that operates in the computing service environment;
create the session connection between an agent running on a computing instance and the messaging service;
upgrade the session connection to create a socket tunneling connection between the agent running on the computing instance and the messaging service;
provide message data streams between the agent running on the computing instance and the messaging service over the socket tunneling connection;
create a second socket tunneling connection between a client device and the computing instance to enable non-transmission control protocol (non-TCP) traffic to be communicated between the client device and the computing instance;
forward an instruction received from a command line application running on the client device to the computing instance over the second socket tunneling connection; and
forward a stream of output received from the computing instance over the second socket tunneling connection to the client device, wherein the stream of output results from an execution of the instruction at the computing instance.

18. The system of claim 17, wherein the plurality of data and instructions, when executed, cause the system to create the second socket tunneling connection between the client device that runs a secure shell (SSH) client and a proxy application that runs on the computing instance, and the second socket tunneling connection enables the client device and the computing instance to communicate the non-TCP traffic including SSH traffic.

19. The system of claim 17, wherein the plurality of data and instructions, when executed by the processor, cause the system to create the second socket tunneling connection between the client device that runs a web browser and a proxy application that runs on the computing instance, and the second socket tunneling connection enables the client device and the computing instance to communicate the non-TCP traffic including remote desktop (RDP) traffic.

20. The system of claim 17, wherein the socket tunneling connection between the agent running on the computing instance and the messaging service utilizes a transmission control protocol (TCP), wherein the non-TCP traffic includes secure shell (SSH) traffic or remote desktop (RDP)-traffic.

* * * * *